(12) United States Patent
Richardson et al.

(10) Patent No.: US 8,692,667 B2
(45) Date of Patent: Apr. 8, 2014

(54) METHODS AND APPARATUS FOR DISTRIBUTED LEARNING OF PARAMETERS OF A FINGERPRINT PREDICTION MAP MODEL

(75) Inventors: Thomas Richardson, South Orange, NJ (US); Aleksandar Jovicic, Jersey City, NJ (US); Cyril Measson, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 13/009,779

(22) Filed: Jan. 19, 2011

(65) Prior Publication Data
US 2012/0182144 A1 Jul. 19, 2012

(51) Int. Cl.
*G08B 1/08* (2006.01)
*H04B 17/00* (2006.01)
*G01S 3/02* (2006.01)

(52) U.S. Cl.
USPC ............... 340/539.13; 455/67.11; 342/464

(58) Field of Classification Search
CPC ........ G08C 2201/00; G01S 7/412; G01S 5/14
See application file for complete search history.

(56) References Cited

U.S. PATENT DOCUMENTS

| | | | |
|---|---|---|---|
| 6,839,560 | B1 | 1/2005 | Bahl et al. |
| 7,035,632 | B2 | 4/2006 | Gutowski |
| 7,209,752 | B2 | 4/2007 | Myllymaki et al. |
| 7,403,784 | B2 | 7/2008 | Ju et al. |
| 7,734,298 | B2 | 6/2010 | Bhattacharya et al. |
| 2004/0116111 | A1 | 6/2004 | Saunders |
| 2004/0259575 | A1 | 12/2004 | Perez-Breva et al. |
| 2006/0240840 | A1 | 10/2006 | Morgan et al. |
| 2008/0036661 | A1* | 2/2008 | Smith et al. .................. 342/464 |

(Continued)

FOREIGN PATENT DOCUMENTS

| | | |
|---|---|---|
| WO | 0069198 A1 | 11/2000 |
| WO | 2005124384 A1 | 12/2005 |
| WO | WO2009059964 A1 | 5/2009 |
| WO | 2010000465 A1 | 1/2010 |
| WO | 2010106530 A2 | 9/2010 |

OTHER PUBLICATIONS

Wenyao Ho, et al., "An Adaptive Two-Phase Approach to WiFi Location Sensing", In Proceedings of PerCom Workshops, 2006. pp. 452-456.

(Continued)

*Primary Examiner* — Steven Lim
*Assistant Examiner* — Omeed Alizada
(74) *Attorney, Agent, or Firm* — James K. O'Hare

(57) ABSTRACT

In accordance with various embodiments, mobile wireless devices which use prediction maps, e.g., RF prediction maps, to determine their location also contribute to the updating and distribution of parameters relating to prediction map generation. After a device determines its location, it uses the signal measurements used in determining the device's location to determine updated parameters which can be used in generating signal prediction maps in the future. The generated parameters are then transmitted to another device for use in generating prediction maps and/or distribution to other devices. In this manner parameters corresponding to a particular location can be updated and distributed without the need for a survey team and/or dedicated equipment. The devices using the prediction map become the devices which also aid in the updating of the parameters used to facilitate generation of a prediction map at some future time. In some embodiments, statistical information corresponding to the updated parameters is also generated and communicated.

17 Claims, 12 Drawing Sheets

(56) References Cited

U.S. PATENT DOCUMENTS

| | | |
|---|---|---|
| 2008/0039114 A1 | 2/2008 | Phatak et al. |
| 2008/0096566 A1 | 4/2008 | Brunner et al. |
| 2008/0227470 A1 | 9/2008 | Tien |
| 2010/0093368 A1 | 4/2010 | Meyer et al. |
| 2010/0093377 A1 | 4/2010 | Riley et al. |
| 2010/0135178 A1 | 6/2010 | Aggarwal et al. |
| 2010/0159957 A1 | 6/2010 | Dando et al. |
| 2011/0034179 A1 | 2/2011 | David et al. |
| 2011/0090123 A1 | 4/2011 | Sridhara et al. |
| 2012/0184219 A1 | 7/2012 | Richardson et al. |
| 2013/0150073 A1 | 6/2013 | Jovicic et al. |

OTHER PUBLICATIONS

International Search Report and Written Opinion—PCT/US2012/021772—ISA/EPO—May 4, 2012.

Lott M, et al., "A Multi-Wall-and-Floor Model for Indoor Radio Propagation", Vehicular Technology Conference, 2001. VTC 2001 Spring. IEEE, May 6, 2001, pp. 464-468, XP001067003.

Wang H, et al., "Enhancing the Map Usage for Indoor Location-Aware Systems", Human-computer interaction, Part2, HCII 2007. LNCS 4551, Jul. 2007, pp. 151-160, XP019062491.

* cited by examiner

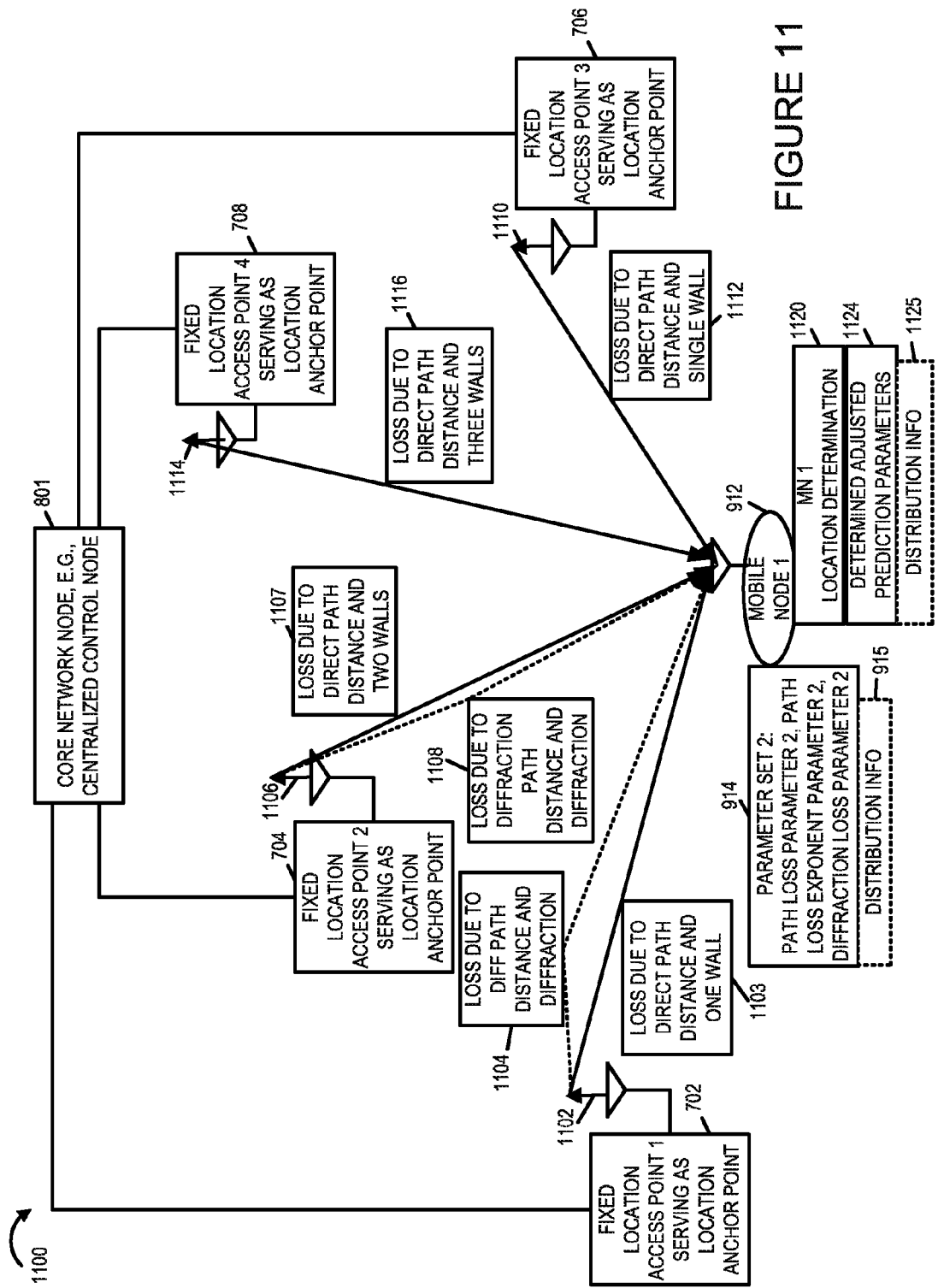

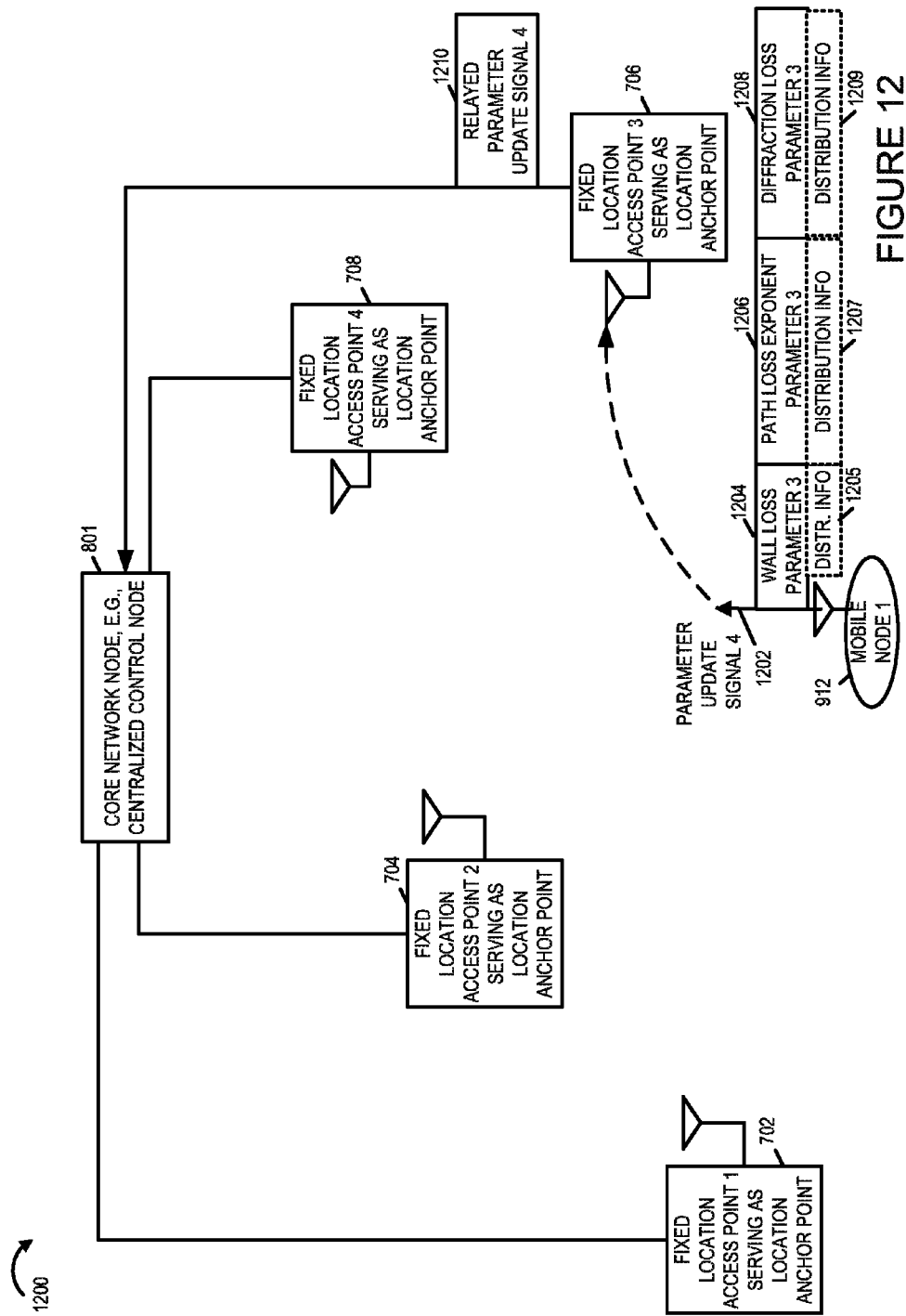

METHODS AND APPARATUS FOR DISTRIBUTED LEARNING OF PARAMETERS OF A FINGERPRINT PREDICTION MAP MODEL

FIELD

Various embodiments relate to mobile device position determination, and more particularly, to methods and apparatus related to dynamically updating parameters used to generate signal prediction maps, e.g., maps which can be used for position determination purposes.

BACKGROUND

Positioning systems based on signal fingerprinting, e.g., RF signal matching, rely on fingerprint prediction, e.g., predicting what RF signals will be detectable at a particular location. The prediction may be represented using a map of the geographic region over which the positioning system operates. The map may contain information describing the spatial (positional) variation of the physical characteristics of the signal(s) that constitute the fingerprint, e.g., RF prediction map, or some portion thereof. In many cases the accuracy of the position estimate produced by a positioning algorithm using a fingerprint map depends upon the accuracy of the underlying fingerprinting map.

Fingerprint maps, e.g., RF prediction maps, may be obtained by various methods. One approach is to determine the fingerprint maps using parametric models of the propagation of the physical signal used by the positioning system. For example, in the case of RF signal based positioning, a ray-tracing algorithm may be used to compute an estimate of received signal power or signal propagation time for a given transmit location. In the indoor setting, e.g., inside a building, the propagation predicted by the ray-tracing algorithm may depend on a number of parameters, such as the RF properties of the wall/ceiling/floor materials, including reflection, refraction and diffraction effects. One benefit of using a parametric model is that the parameters, together with the building map, constitute a compact representation of the information used to estimate signal characteristics for arbitrary transmit and receive locations. If the number of potential transmit and receive locations is large, then such a model can be a more efficient means of data representation as compared to, say, directly storing the fingerprint value as a function of transmit and receive position. Efficient representation implies smaller storage requirements and/or more efficient communication of map information. Communication of map information often plays an important role in positioning systems.

One problem with the parametric model based approach to generating fingerprint maps is that the reliability of the map depends on the accuracy of the parameters used in generating the map. While the parameters may be based on an initial RF signal survey made at a point in time or over some time period, after the survey is completed RF signal sources may change and/or physical conditions may change affecting RF signal propagation at one or more locations covered by a fingerprint map. It can be costly and/or impractical to conduct RF surveys frequently.

In view of the above discussion, it should be appreciated that there is a need for methods and apparatus which can be used in updating parameters used to generate prediction maps, e.g., without requiring a complete RF survey to be conducted as part of the updating process.

SUMMARY

Various embodiments are directed to methods and apparatus for updating parameters used to generate prediction maps, communicating updated parameters, receiving updated parameters, and/or updating prediction maps. Parameter updates are based on one or more signal measurements obtained during a location determination operation. The prediction maps are sometimes referred to as fingerprint prediction maps since they can be used to identify and/or determine a location based on the signal characteristics of the location. The methods may be used, e.g., in a mobile wireless device such as a handheld battery powered mobile node. In some embodiments a mobile wireless device receives signals, e.g., from fixed location access points serving as location anchor points, and performs signal measurements of the received signals, e.g., RF and/or other signal measurements. The signal measurements are used by the mobile device in determining its location. Exemplary physical signal characteristics which may be, and in some embodiments are, measured include, e.g., signal power, time delay, delay-spread, temperature, sound intensity, magnetic field strength, or a vector of such quantities, and the nature of the signal or signals could be electromagnetic, acoustic, etc. One, multiple, or all of the exemplary signal characteristics may, and in some embodiments are, used depending on the particular embodiment.

In some exemplary embodiments, in performing a mobile device positioning determination operation, the mobile device compares the one or more measured quantities, e.g., each corresponding to a different signal characteristic, against predictions inherent in the prediction map being used for location determination purposes. After determining the location of the mobile device to which the signal characteristic measurement or measurements correspond, the mobile wireless device may, and in some embodiments does, use the measurements to update parameters used to generate a signal prediction map. The updated parameters may include, for example, one, multiple or all of: a wall loss parameter, a path loss parameter, a diffraction loss parameter, a reflection loss parameter, and a refraction loss parameter. Furthermore, in some embodiments, the measurements may also be used to update statistics of one or more of the parameters such as, e.g., a mean, variance, and/or a distribution function. In some embodiments, the updated statistics of the one or more parameters are also used in generating a signal prediction map.

In some embodiments parameter updating is performed when the location of a mobile device is determined to a predetermined degree of certainty but not when the position of a mobile device is determined with a lower degree of certainty. In this manner, parameter updating may be limited to cases where there is a high degree of certainty that the signal measurements being used to update parameters associated with a particular location actually correspond to the location for which parameters are being updated.

In various embodiments, the mobile wireless device generates a parameter update signal to communicate an updated parameter or parameters, and transmits the parameter update signal to another node, e.g., to a core network node via an access point. In some such embodiments, the parameter update signal further includes statistical information corresponding to the updated parameter or parameters. In some embodiments, a network node, e.g., a core network node which is centralized control node, receives parameter update signals from a plurality of mobile wireless devices and uses the received update information to modify, e.g., refine, a stored set of parameters used to generate signal prediction maps. Updating stored parameters may include one or more or all of: aggregating received parameters received from multiple wireless devices, modifying stored parameters based on received parameters, replacing stored parameters with received parameters, and/or combining information corresponding to the same parameter received from multiple wireless devices, e.g., performing averaging and/or weighted averaging.

In some embodiments, a network node generates a parameter update signal including updated parameter information, e.g., based on parameter update information from one or more mobile wireless devices, and communicates its generated parameter update signal to the mobile wireless devices, e.g., via broadcast signals from access points. In some such embodiments, the parameter update signal further includes statistical information corresponding to the updated parameter or parameters. The mobile wireless device receives the parameter update signal from the network node, and updates its set of stored parameters used to generate signal prediction maps.

In this manner, parameters used for generating prediction maps are updated based on signals collected for use in determining the location of a device without the need to conduct, or use of, an updated survey and/or take signal measurements specifically for the purpose of updating prediction map parameters. An advantage of this approach is not only that the need for repeated surveys is reduced or avoided but also that locations which are frequented by devices are likely to be updated relatively frequently and remain current.

In accordance with various embodiments mobile wireless devices, e.g., mobile wireless terminals which use prediction maps to determine their location also contribute to the updating and distribution of parameters relating to prediction map generation. In some embodiments, after a device determines its location, e.g., with a predetermined level of certainty, it uses the signal measurements used in determining the device's location to determine updated parameters which can be used in generating signal prediction maps in the future. The generated parameters are then transmitted to another device, e.g., another mobile device or device in the network, for use in generating prediction maps and/or distribution to other devices. In this manner parameters corresponding to a particular location can be updated and distributed without the need for a survey team and/or dedicated equipment. The devices using the prediction map become the devices which also aid in the updating of the parameters used to facilitate generation of a prediction map at some future time. Parameter updating and/or distribution of updated parameters is conditionally performed, in some embodiments, when a predetermined level of certainty is obtained with regard to the device location determination, e.g., indicating that the reliability of the updated parameters can be trusted. Since the parameter updates are done from actual device locations as opposed to a general survey, the parameters for locations which are frequently visited will be updated promptly and repeatedly resulting in rapid refinement and updating of the parameters which are likely to be frequently used in device location determination.

An exemplary method of operating a mobile wireless device, in accordance with various embodiments, comprises: measuring signal characteristics of received signals; determining a position of the mobile wireless device based on the measured signal characteristics; adjusting at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device; and transmitting a prediction parameter update signal including at least one of: (i) the adjusted prediction parameter, (ii) adjusted statistics of a prediction parameter, or (iii) the adjusted distribution of a prediction parameter, to another mobile wireless device or a network device. An exemplary mobile wireless device, in accordance with some embodiments, comprises: at least one processor configured to: measure signal characteristics of received signals; determine a position of the mobile wireless device based on the measured signal characteristics; adjust at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device; and transmit a prediction parameter update signal including at least one of: (i) the adjusted prediction parameter, (ii) adjusted statistics of a prediction parameter, or (iii) the adjusted distribution of a prediction parameter, to another mobile wireless device or a network device. The exemplary mobile wireless device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 11 illustrates exemplary signaling, attenuation sources and signal measurements corresponding to the FIG. 10 example.

FIG. 12 is a drawing illustrating that an exemplary mobile node generates and communicates a parameter update signal to communicate adjusted, e.g., refined, parameters, that it has determined based on measurements, and the adjusted parameters can be used to generate a signal prediction map, e.g., a more accurate signal prediction map.

DETAILED DESCRIPTION

Figure 1:
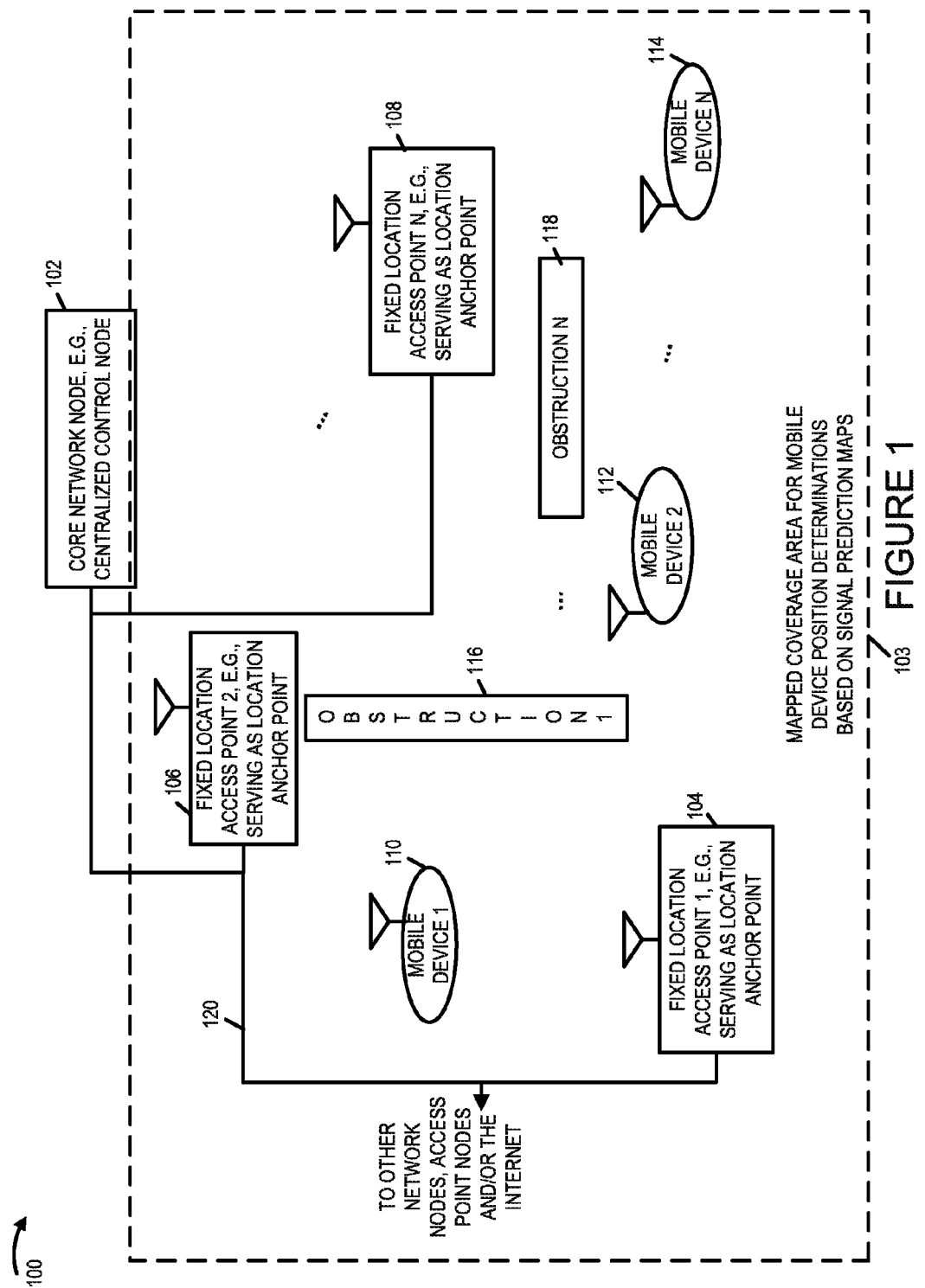
FIG. 1 is a drawing of an exemplary communications system including mobile device location determination capability using generated signal prediction maps based on parameters which can be dynamically updated in accordance with various exemplary embodiments.

FIG. 1 is a drawing of an exemplary communications system 100 including mobile device location determination capability in accordance with various exemplary embodiments. Exemplary system 100 includes a core network node 102, e.g., a centralized control node, and a plurality of fixed location access points (access point 1 104, access point 2 106, . . . , access point N 108) coupled together via a backhaul network 120. The fixed location access points (104, 106, . . . , 108) serve as location anchor points in the system. The backhaul network 120 couples the nodes (102, 104, 106, . . . , 108) to one another, to other network nodes and/or to the Internet. There is a mapped coverage area 103 for which mobile devices perform mobile device position determinations based on signal prediction maps. In some embodiments, core network node 102 is located within the coverage area 103. In other embodiments, core network node 102 is located outside the coverage area 103. In still other embodiments, core network node 102 is located on a boundary of the coverage area 103. Within the coverage area 103, there are a plurality of obstructions (obstruction 1 116, . . . , obstruction N 118). An exemplary obstruction is a wall, which potentially affects signaling between a fixed location access point and a mobile device, e.g., causing attenuation as a signal passes through one or more walls and/or causing attenuation due to diffraction as a signal bends around a corner.

System 100 also includes a plurality of mobile wireless devices (mobile device 1 110, mobile device 2 112, . . . , mobile device N 114), which may move throughout the system and determine their current position based on signal prediction maps. A mobile device determines its position based on signal prediction map information and signal measurement information. In various embodiments, a set of parameters is used to generate a signal prediction map corresponding to an access point. In some such embodiments, the same set of parameters is used to generate multiple signal prediction maps, and different signal prediction maps corresponding to different access points. In one embodiment a set of parameters used to generate a signal prediction map includes: a wall loss parameter, a path loss exponent parameter, and a diffraction parameter.

The set of parameters may be, and sometimes is, updated, e.g., refined, based on measurements as the system is operated. In various embodiments, a mobile device receives a prediction parameter update signal, e.g., from a core network node 102 via an access point, and updates its stored set of parameters used to generate a signal prediction map. The received parameter update signal may, and sometimes does include aggregated and/or averaged information corresponding to multiple mobile devices. In various embodiments, a mobile device generates a prediction parameter update signal based on its measurements and transmits the generated prediction parameter update signal, e.g., to the network node 102 via an access node.

In some embodiments, the core network node 102 is not included. In various embodiments, communications between the access points and the mobile devices use a peer to peer signaling protocol. In some embodiments, the mapped coverage area 103 corresponds to each of the access points (104, 106, . . . , 108). In some embodiments, different portions of the mapped coverage area 103 correspond to different access points. In some such embodiments, at least some of the different portions are partially or fully overlapping.

In some embodiments, parameter updating signals including parameters used to generate signal prediction maps and/or information used to derive parameters used to generate signal prediction maps are communicated directly between mobile wireless devices, e.g., using a peer to peer signaling protocol.

Figure 2:
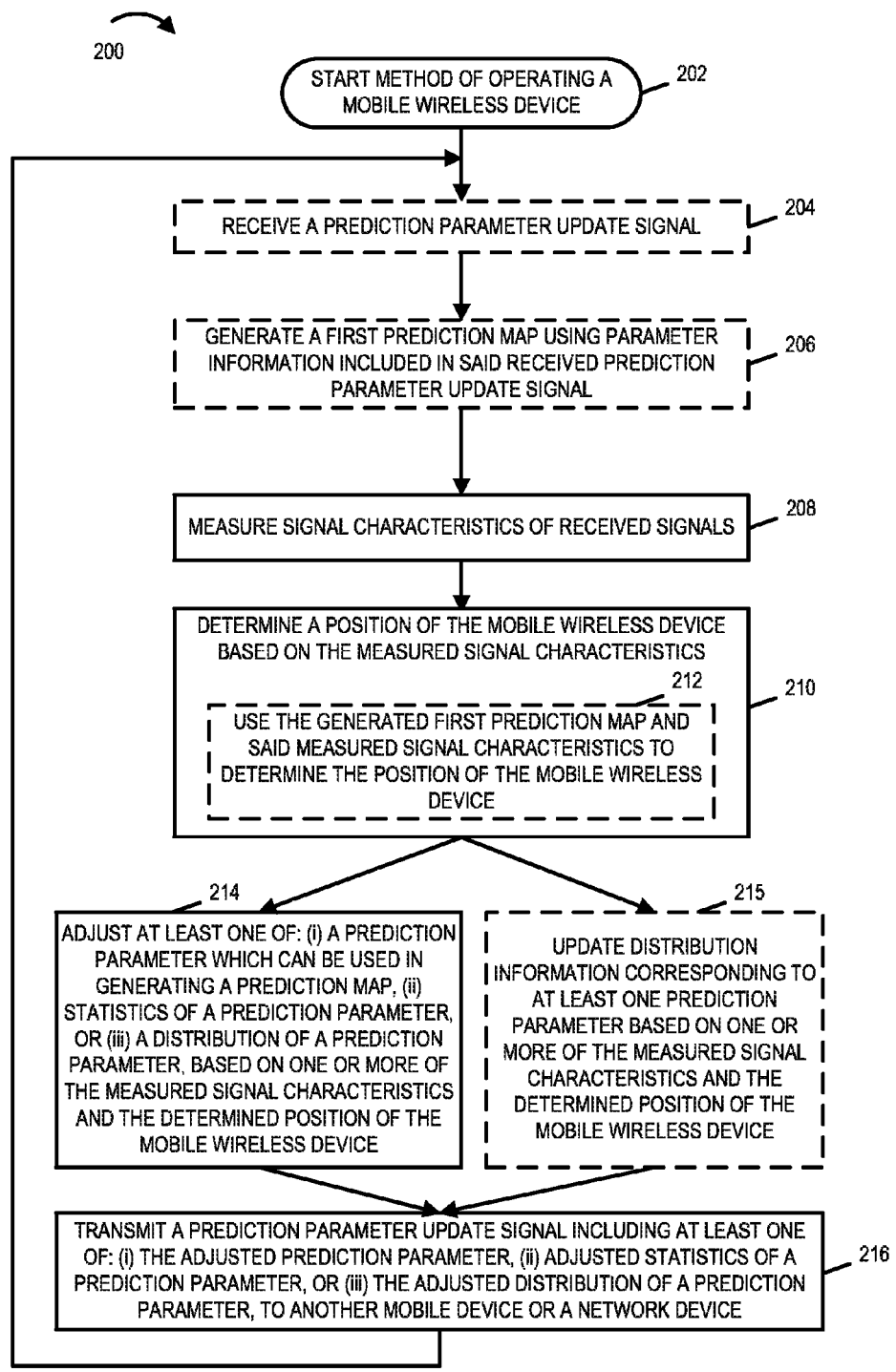
FIG. 2 is a flowchart of an exemplary method of operating a mobile wireless device in accordance with various embodiments.

FIG. 2 is a flowchart 200 of an exemplary method of operating a mobile wireless device in accordance with various embodiments. The exemplary mobile wireless device is, e.g., one of the mobile devices (110, 112, . . . , 114) of FIG. 1. Operation starts in step 202, where the mobile wireless device is powered on and initialized. Operation proceeds from start step 202 to step 204.

In step 204 the mobile wireless device receives a prediction parameter update signal. In some embodiments, the received prediction parameter update signal is from a core network node, e.g., via an access point. In some embodiments, the received prediction parameter update signal is from an access point, e.g., an access point serving as a location anchor point. In some embodiments, the received prediction parameter update signal is from another mobile wireless device, e.g., a peer to peer signal from another mobile wireless device which does not traverse an access point. In some embodiments, the received prediction parameter update signal is a command to update a prediction parameter. In some embodiments, the received prediction parameter update signal is a suggestion to update a prediction parameter. In some embodiments, the received prediction parameter update signal is a broadcast signal. In some embodiments, the prediction parameter update signal is a signal addressed to the mobile wireless device. In some embodiments, the received prediction parameter update signal is a signal addressed to a group of mobile wireless devices.

In some embodiments, the received prediction parameter update signal includes parameter information generated by multiple different mobile wireless devices, e.g., multiple different wireless terminals, and is communicated from a network device which aggregated the parameter update information from said multiple different mobile wireless devices. The network device is, e.g., one of an access point and a core network node. For example, different mobile wireless devices may provide different parameters to be updated and the network node can aggregate the parameters estimated by the different mobile wireless devices and come up with a new set of parameters for a prediction map. For example, a second mobile wireless device may provide a wall loss parameter to be updated based on its estimations, while a third mobile wireless device may provide a path loss exponent parameter to be updated based on its estimations, and a fourth mobile wireless device may provide a diffraction loss parameter to be updated based on its estimations, and a network device aggregates the information and generates the prediction parameter update signal which is received by the mobile wireless device.

In some embodiments, the received prediction parameter update signal includes parameter information which is a function of updated parameter information generated by multiple different mobile wireless devices. For example, multiple mobile wireless devices may estimate parameter updates corresponding to one or more parameters and communicate the parameter update information to a network node; the network node may combine, e.g., aggregate and/or perform weighted averaging, the received information and generate a parameter update signal. Then, the parameter update signal may be communicated, e.g., broadcast, the mobile wireless devices, e.g., via one or more access points.

In some embodiments, said received prediction parameter update signal includes at least one parameter and distribution information corresponding to said at least one parameter.

Operation proceeds from step 204 to step 206. In step 206 the mobile wireless device generates a first prediction map using parameter information included in said received prediction parameter update signal. In some embodiments, the generated prediction map includes a set of prediction values wherein each member in the set corresponding to a received signal measurement prediction for a different location on a map, e.g., a matrix of prediction values corresponding to signal characteristic which is being measured. In various embodiments, the prediction values are predictions of one of: received signal power, e.g., received RF signal power, detected magnetic field strength, received audible level, received visible light intensity, and received IR light intensity. In one exemplary embodiment, the first prediction map is a 2 dimension matrix of power values, e.g., received power predictions, corresponding to different location on a grid map and an access point serving as a location anchor point which is transmitting signals which are being measured. In various embodiments the generated first prediction map, may be and sometimes is, generated using the parameter information included in the received prediction parameter update signal in combination with a floor map and stored transmit power information, e.g., stored RF transmit power information corresponding to an access point serving as a location anchor point. In some embodiments, the transmit power identified or indicated by the stored transmit power information corresponding to the access point is fixed. In some embodiments, the transmit power identified or indicated by the stored transmit power information corresponding to the access point in time varying, e.g., in accordance with a schedule and/or recurring timing structure.

In some embodiments, generating a first prediction map includes using said at least one parameter and said distribution information corresponding to said at least one parameter which was included in said received prediction parameter update signal. Operation proceeds from step 206 to step 208.

In step 208 the mobile wireless device measures signal characteristics of received signals. Then in step 210 the mobile wireless device determines a position of the mobile wireless device based on the measured signal characteristics. In some embodiments, step 210 includes step 212 in which the mobile wireless device uses the generated first prediction map and said measured signal characteristics to determine the position of the mobile wireless device. Operation proceeds from step 210 to step 214, and in some embodiments from step 210 to step 215.

In step 214 the mobile wireless device adjusts at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device. In some embodiments, the adjusted prediction parameter corresponds to the determined location. In some embodiments, the prediction parameter which is adjusted is a prediction parameter which was used in determining the position of the mobile wireless device. In some embodiments, the prediction parameter is an RF prediction parameter. In some embodiments, the prediction parameter is a magnetic field prediction parameter. In various embodiments, the prediction parameter is not a signal measurement value but is generated from at least one signal measurement. For example, in some embodiments, the prediction parameter is one of a wall loss parameter, a path loss exponent parameter, and a diffraction loss parameter. Other exemplary prediction parameters include a refraction loss parameter and a reflection loss parameter. Operation proceeds from step 214 to step 216.

In some embodiments, step 215 is included. In step 215 the mobile wireless device updates distribution information corresponding to at least one prediction parameter based on one or more of the measured signal characteristics and the determined position of the mobile wireless device. Operation proceeds from step 215 to step 216.

In step 216 the mobile wireless device transmits a prediction parameter update signal including at least one of: (i) the adjusted prediction parameter, (ii) adjusted statistics of a prediction parameter, or (iii) the adjusted distribution of a prediction parameter, to another mobile device or a network device. In some embodiments, said transmitted prediction parameter update signal further includes said updated distribution information corresponding to at least one prediction parameter. Operation proceeds from step 216 to step 204.

Figure 3:
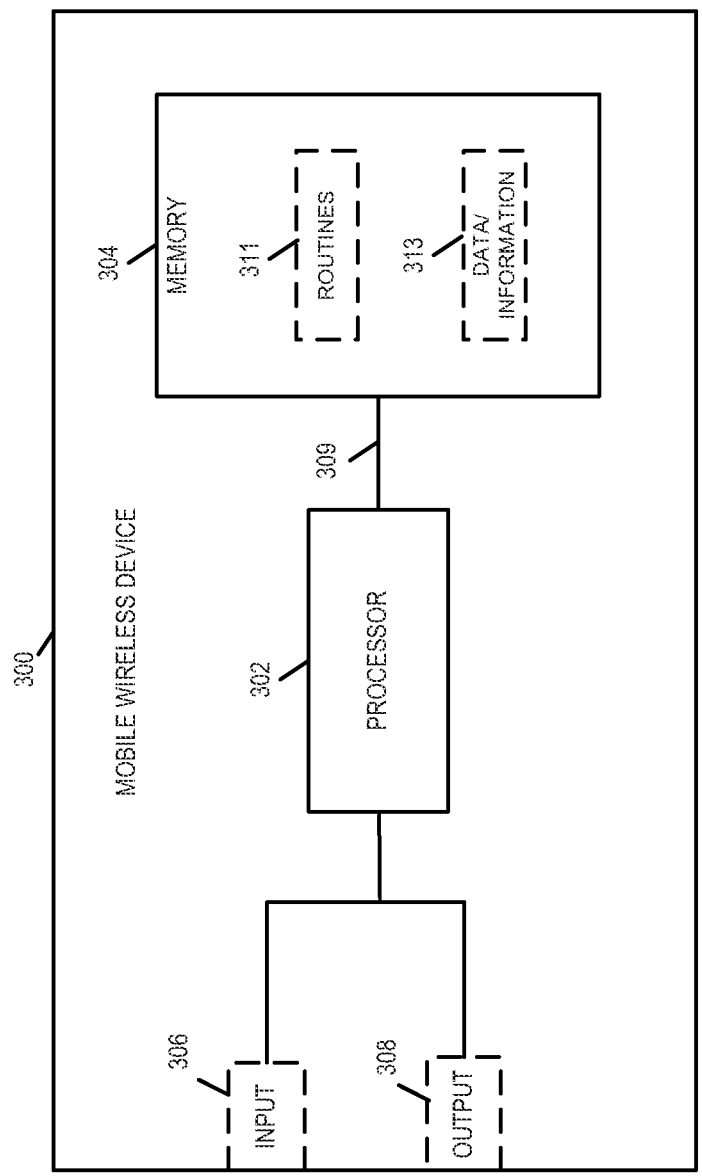
FIG. 3 is a drawing of an exemplary mobile wireless device in accordance with an exemplary embodiment.

FIG. 3 is a drawing of an exemplary mobile wireless device 300 in accordance with an exemplary embodiment. Exemplary mobile wireless device 300 is, e.g., one of the mobile devices of system 100 of FIG. 1. Exemplary mobile wireless device 300 may, and sometimes does, implement a method in accordance with flowchart 200 of FIG. 2.

Mobile wireless device 300 includes a processor 302 and memory 304 coupled together via a bus 309 over which the various elements (302, 304) may interchange data and information. Mobile wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to measure signal characteristics of received signals; determine a position of the mobile wireless device based on the measured signal characteristics; and adjust at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device. In some such embodiments processor 302 is further configured to transmit a prediction parameter update signal including at least one of: (i) the adjusted prediction parameter, adjusted statistics of a prediction parameter, or (iii) the adjusted distribution of a prediction parameter, to another mobile wireless device or a network device.

In various embodiments, processor 302 is further configured to update distribution information corresponding to at least one prediction parameter based on one or more of the measured signal characteristics and the determined position of the mobile wireless device. In some such embodiments, processor 302 is further configured to transmit said updated distribution information corresponding to said at least one prediction parameter, as part of being configured to transmit a prediction parameter update signal.

In some embodiments, said adjusted prediction parameter corresponds to said determined position. In various embodiments, the prediction parameter which is adjusted is a prediction parameter which was used in determining the position of the mobile wireless device. In some such embodiments the prediction parameter is an RF or magnetic field prediction parameter.

In various embodiments, said prediction parameter is not a signal measurement value but is generated from at least one signal measurement. For example, the prediction parameter is one of: a wall loss parameter, path loss exponent parameter and diffraction loss parameter.

In various embodiments, processor 302 is further configured to: receive a prediction parameter update signal; and generate a first prediction map using parameter information included in said prediction parameter update signal In some embodiments, the first prediction map is a 2 dimensional matrix of power values, e.g., received power predictions. In some embodiments, processor 302 is configured to use floor map information, transmit power information, e.g., RF transmit power information, corresponding to one or more access points serving as location anchor points. The transmission power level information may identify or define a fixed transmission power level and/or a time varying transmission power level.

In some embodiments, the received prediction parameter update signal is from a network node, e.g., a centralized server, via an access point. In some embodiments, the received prediction parameter update signal is from an access point serving as a location anchor point. In some embodiments, the received prediction parameter update signal is from another mobile wireless device.

In some embodiments, the received prediction parameter update signal includes parameter update information generated by multiple different wireless terminals and is from a network device which aggregated the parameter update information from said multiple different wireless terminals. For example different mobile devices may provide a network device with different updated parameters and the network device can aggregate updated parameters estimated by different mobile devices to come up with new set of parameters for a map, e.g., one mobile device provides a wall loss parameter update and another mobile device provides an updated path loss exponent parameter or diffraction loss parameter.

In some embodiments, the received prediction parameter update signal includes parameter update information based on input from multiple different wireless terminals and is from a network device which combined the parameter update information from said multiple different wireless terminals. In some such embodiments, the combining includes one or more or all of: averaging, weighted averaging, selection, and aggregation.

In various embodiments, said received prediction parameter update signal includes at least one parameter and distribution information corresponding to said at least one parameter. In some such embodiments, processor 302 is configured to use said at least one parameter and said distribution information corresponding to said at least one parameter, as part of being configured to generate a first prediction map.

In various embodiments, processor 302 is further configured to generate said first prediction map prior to determining a position of the mobile wireless device, processor 302 is configured to use the generated first prediction map and said measured signal characteristics to determine the position of the mobile wireless device, as part of being configured to determine the position of the mobile wireless device.

Figure 4:
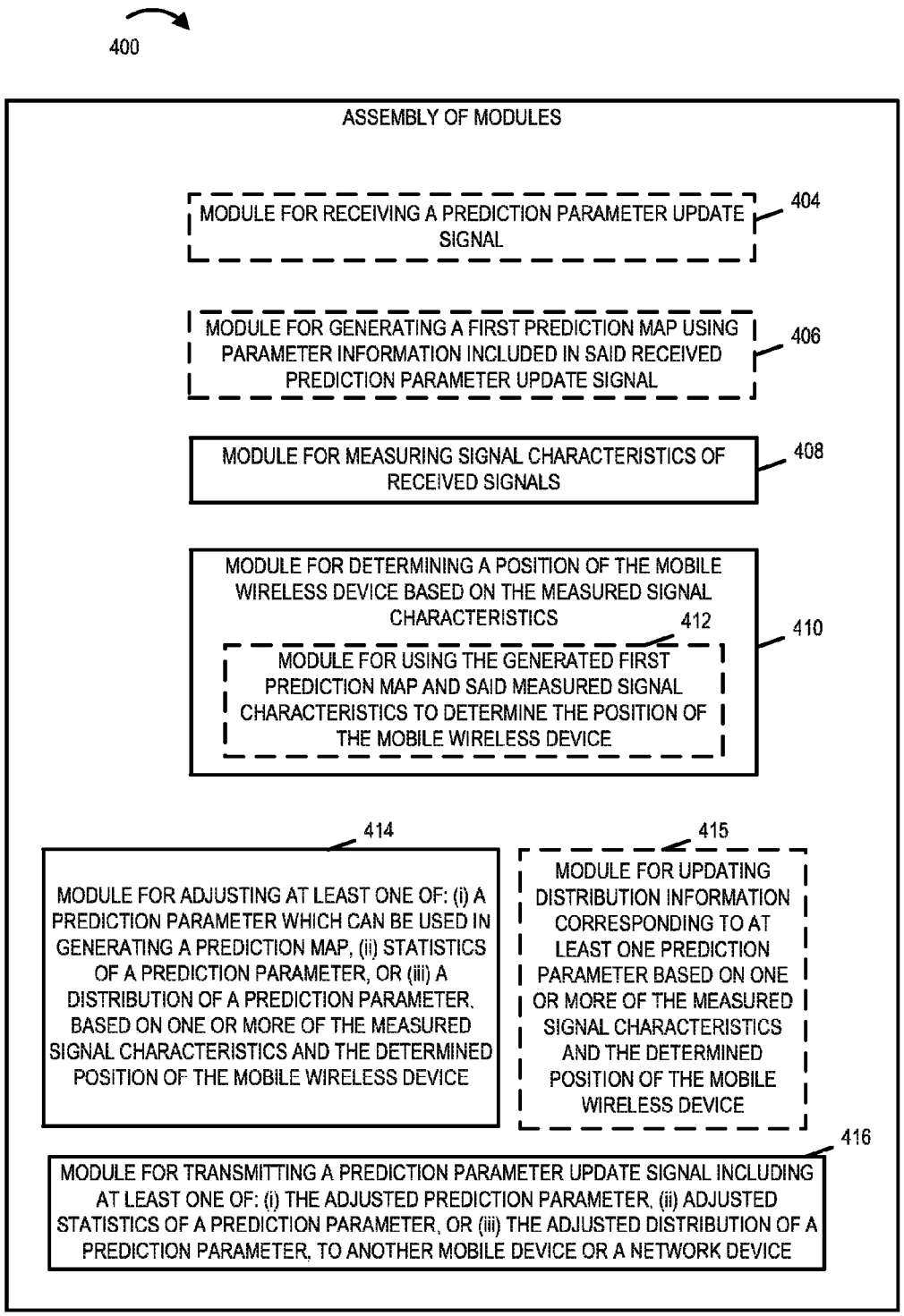
FIG. 4 is an assembly of modules which can, and in some embodiments is, used in the exemplary mobile wireless device illustrated in FIG. 3.

FIG. 4 is an assembly of modules 400 which can, and in some embodiments is, used in the exemplary mobile wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of mobile wireless device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the mobile wireless device 300 or elements therein such as the processor 302, to perform the functions of the corresponding steps illustrated and/or described in the method of flowchart 200 of FIG. 2.

Assembly of modules 400 includes a module 404 for receiving a prediction parameter update signal, a module 406 for generating a first prediction map using parameter information included in said received prediction parameter update signal, a module 408 for measuring signal characteristics of received signals, a module 410 for determining a position of the mobile wireless device based on the measured signal characteristics, a module 414 for adjusting at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device, a module 415 for updating distribution information corresponding to at least one prediction parameter based on one or more of the measured signal characteristics and the determined position of the mobile wireless device, and a module 416 for transmitting a prediction parameter update signal including at least one of: (i) the adjusted prediction parameter, (ii) adjusted statistics of a prediction parameter, or (iii) the adjusted distribution of a prediction parameter, to another mobile device or a network device. Module 410 includes a module 412 for using the generated first prediction map and said measured signal characteristics to determine the position of the mobile wireless device.

In some embodiments, the adjusted prediction parameter corresponds to the determined location. In various embodiments, the prediction parameter which is adjusted is a prediction parameter which was used in determining the location of the mobile device. In various embodiments, the prediction parameter is not a signal measurement value but is generated from at least one signal measurement.

In some embodiments, the received prediction parameter update signal is from another mobile wireless device. In some embodiments the received prediction parameter update signal includes parameter update information generated by multiple different mobile wireless devices, e.g., mobile wireless terminals, and is from a network device which aggregated the information from said multiple different mobile wireless devices. In some embodiments the received prediction parameter update signal includes parameter update information generated by multiple different mobile wireless devices, e.g., mobile wireless terminals, and is from a network device which combined the information from said multiple different mobile wireless devices, e.g., via averaging, weighted averaging, selection, and/or aggregation.

In some embodiments, the received prediction parameter update signal includes at least one parameter and distribution information corresponding to said at least one parameter. In some such embodiments, module 406 generates a first prediction map using said at least one parameter and said distribution information corresponding to said at least one parameter which was included in said received prediction parameter update signal.

In various embodiments, the transmitted prediction parameter update signal transmitted by module 416 further includes said updated distribution information corresponding to said at least prediction parameter which was generated by module 415.

Figure 5:
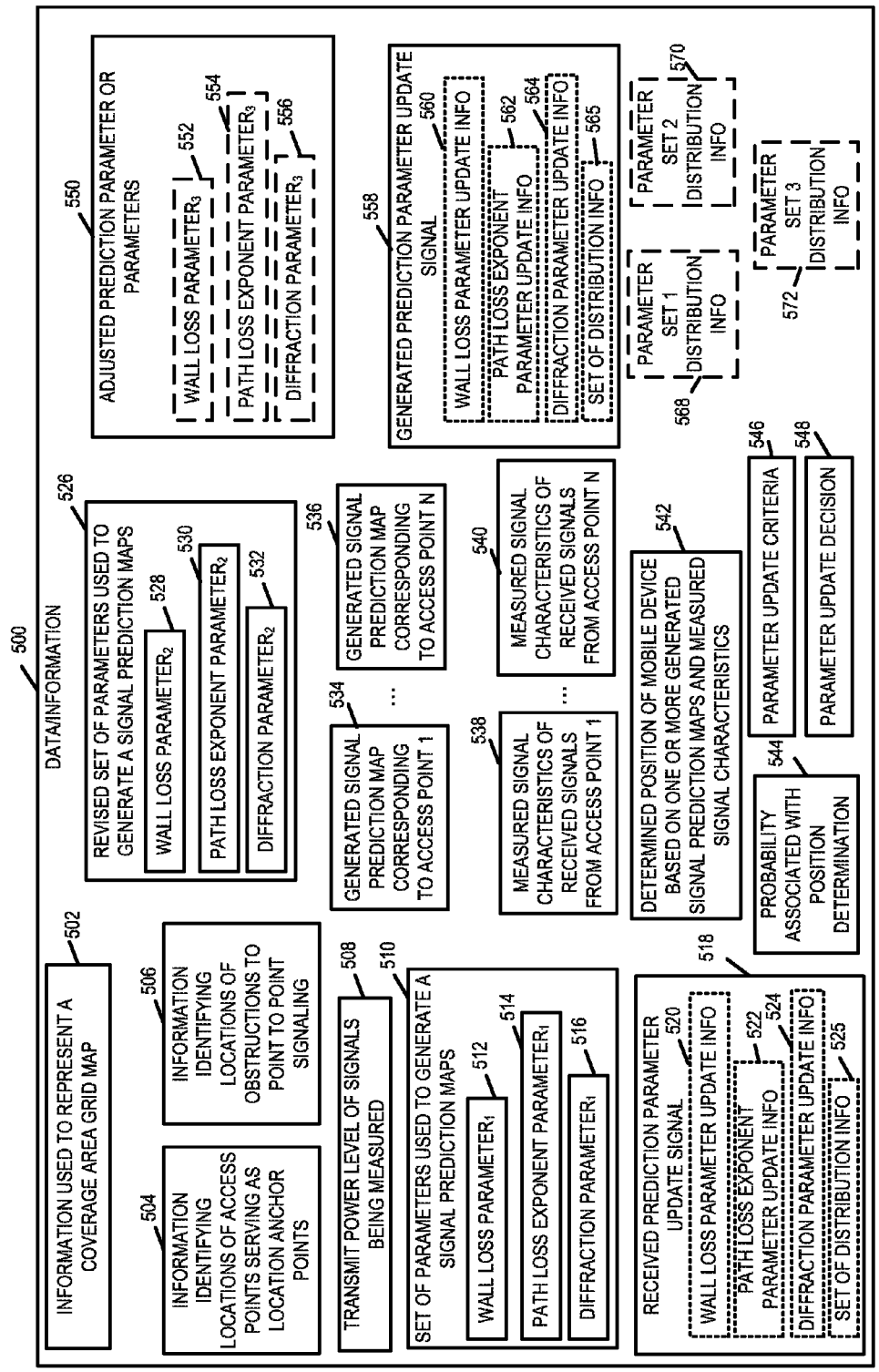
FIG. 5 is a drawing of data/information which may be included in the exemplary mobile wireless device of FIG. 3 in accordance with an exemplary embodiment.

FIG. 5 is a drawing of data/information 500 in accordance with an exemplary embodiment. Data/information 500 is, e.g., data/information 313 of mobile wireless device 300 of FIG. 3. Data/information 500 includes information used to represent a coverage area gridmap 502, information identifying location of access points serving as location anchor points 504, information identifying locations of obstruction to point to point signals 506, information identifying or specifying the transmit power level of signals being measured 508, and a set of parameters used to generate signal prediction maps 510. The set of parameters used to generated signal prediction maps 510 includes wall loss parameter 1 512, path loss exponent parameter 1 514, and diffraction parameter 1 516.

Data/information 500 further includes a received prediction parameter update signal 518 and a revised set of parameters used to generate signal prediction maps 526. Received prediction parameter update signal includes one or more or all of: wall loss parameter update information 520, path loss exponent parameter update information 522 and diffraction parameter update information 524. Revised set of parameters used to generate signal prediction maps 526 includes wall loss parameter 2 528, path loss exponent parameter 2 530 and diffraction parameter 2 532.

Data/information 500 further includes generated signal prediction maps corresponding to a plurality of access points serving as location anchor points (generates signal prediction map corresponding to an access point 1 534, . . . , generated signal prediction map corresponding to access point N 536). Data/information 500 further includes measured signal characteristics of received signals from a plurality of access points (measured signal characteristics of received signals from access point 1 538, . . . , measured signal characteristics of received signal from access point N 540). Data/information 500 also includes a determined position of the mobile wireless device based on one or more generated signal prediction maps and measured signal characteristics of received signals 542, a probability associated with the position determination 544, prediction parameter updating criteria 546, and a parameter updating decision 548.

Data/information 500 further includes adjusted prediction parameter or parameters 550 and a generated prediction parameter update signal 558. Adjusted prediction parameter or parameters 550 include one or more or all of: wall loss parameter 3 552, path loss exponent parameter 3 554 and diffraction parameter 3 556. Generated prediction parameter update signal 558 includes one or more of all of: wall loss parameter update information 560, path loss exponent parameter update information 562 and diffraction parameter update information 564.

Received prediction parameter update signal information 518 is, e.g., received by module 404. Set of parameters used to generate signal prediction maps 510 is updated based on received signal 518 to obtain a revised set of parameters used to generate signal prediction maps 526. The generated first prediction map used by module 206 is, e.g., one of the generated signal prediction maps (534, . . . , 536), which was generated based on: (i) the revised set of parameters 526 which were updated based on received signal 518, (ii) map information 502, (iii) access point location information 504, (iv) obstruction, e.g., wall, location information 506 and (v) transmit power information 508. The measured signal characteristics measured by module 408 is, e.g., one of the measured signal characteristics (538, . . . , 540) corresponding to the access point for which the generated prediction map (534, . . . , 536) corresponds. Determined position 542 is a determination performed by module 410. The mobile node also estimates a probability associated with the position determination which is information 544. The mobile device uses criteria 546 for deciding whether or not to update one or more prediction parameters and whether or not to generate and transmit a prediction parameter update signal. Exemplary criteria 546 include a threshold against which probability information 544 is compared, and a change threshold. For example, in some embodiments, the mobile wireless device updates a prediction parameter when the position determination probability exceeds a predetermined location accuracy threshold and when the amount of prediction parameter change exceeds a minimum prediction parameter change value. In various embodiments, prediction parameters may be, and sometimes are updated on an individual basis, e.g., with different updating criteria being used corresponding to different types of parameters. Adjusted prediction parameter or parameters 550 is an output of module 414. Generated prediction parameter update signal 558 is the signal transmitted by module 416.

In some embodiments, data/information 500 also includes distribution information corresponding to parameters used to generate signal predication maps. For example, in some embodiments, data/information 500 includes parameter set 1 distribution information 568 corresponding to parameter set 510, parameter set 2 distribution information 570 corresponding to revised parameter set 526, and parameter set 3 distribution information 572 corresponding to adjusted parameter set 550. Parameter set 1 distribution information 568 includes, e.g., a mean corresponding to wall loss parameter$_1$ 512, a variance corresponding to wall loss parameter$_1$ 512, a mean corresponding to path loss exponent parameter$_1$ 514, a variance corresponding to path loss exponent parameter$_1$ 514, a mean corresponding to diffraction parameter$_1$ 516, and a variance corresponding to diffraction parameter$_1$ 516. Parameter set 2 distribution information 560 includes, e.g., a mean corresponding to wall loss parameter$_2$ 528, a variance corresponding to wall loss parameter$_2$ 528, a mean corresponding to path loss exponent parameter$_2$ 530, a variance corresponding to path loss exponent parameter$_2$ 530, a mean corresponding to diffraction parameter$_2$ 532, and a variance corresponding to diffraction parameter$_2$ 532. Parameter set 3 distribution information 572 includes, e.g., a mean corresponding to wall loss parameter$_3$ 552, a variance corresponding to wall loss parameter$_3$ 552, a mean corresponding to path loss exponent parameter$_3$ 554, a variance corresponding to path loss exponent parameter₃ 554, a mean corresponding to diffraction parameter₃ 556, and a variance corresponding to diffraction parameter₃ 556.

In some embodiments, the communicated prediction parameter update signals also convey distribution information corresponding to the parameters being communicated. For example, received prediction parameter update signal 518 in some embodiments, conveys a set of distribution information 525 corresponding to the one or more parameters (520, 522, 524) which are being communicated. Similarly, in some embodiments, generated prediction parameter update signal 558 includes set of distribution information 565 corresponding to the one or more parameters (560, 562, 564) which are being communicated.

In some embodiments, wall loss parameter update information 520 conveys a wall loss parameter, path loss exponent parameter update information 522 conveys a path loss exponent parameter, and diffraction parameter update information 524 conveys a diffraction parameter. Set of distribution information 525 includes, e.g., a mean corresponding to the wall loss parameter of information 520, a variance corresponding to wall loss parameter of information 520, a mean corresponding to the path loss exponent parameter of information 522, a variance corresponding to the path loss exponent parameter of information 522, a mean corresponding to the diffraction parameter of information 524, and a variance corresponding to the diffraction parameter of information 524.

In some embodiments, wall loss parameter update information 560 conveys a wall loss parameter, path loss exponent parameter update information 562 conveys a path loss exponent parameter, and diffraction parameter update information 564 conveys a diffraction parameter. Set of distribution information 565 includes, e.g., a mean corresponding to the wall loss parameter of information 560, a variance corresponding to wall loss parameter of information 560, a mean corresponding to the path loss exponent parameter of information 562, a variance corresponding to the path loss exponent parameter of information 562, a mean corresponding to the diffraction parameter of information 564, and a variance corresponding to the diffraction parameter of information 564.

Figure 6:
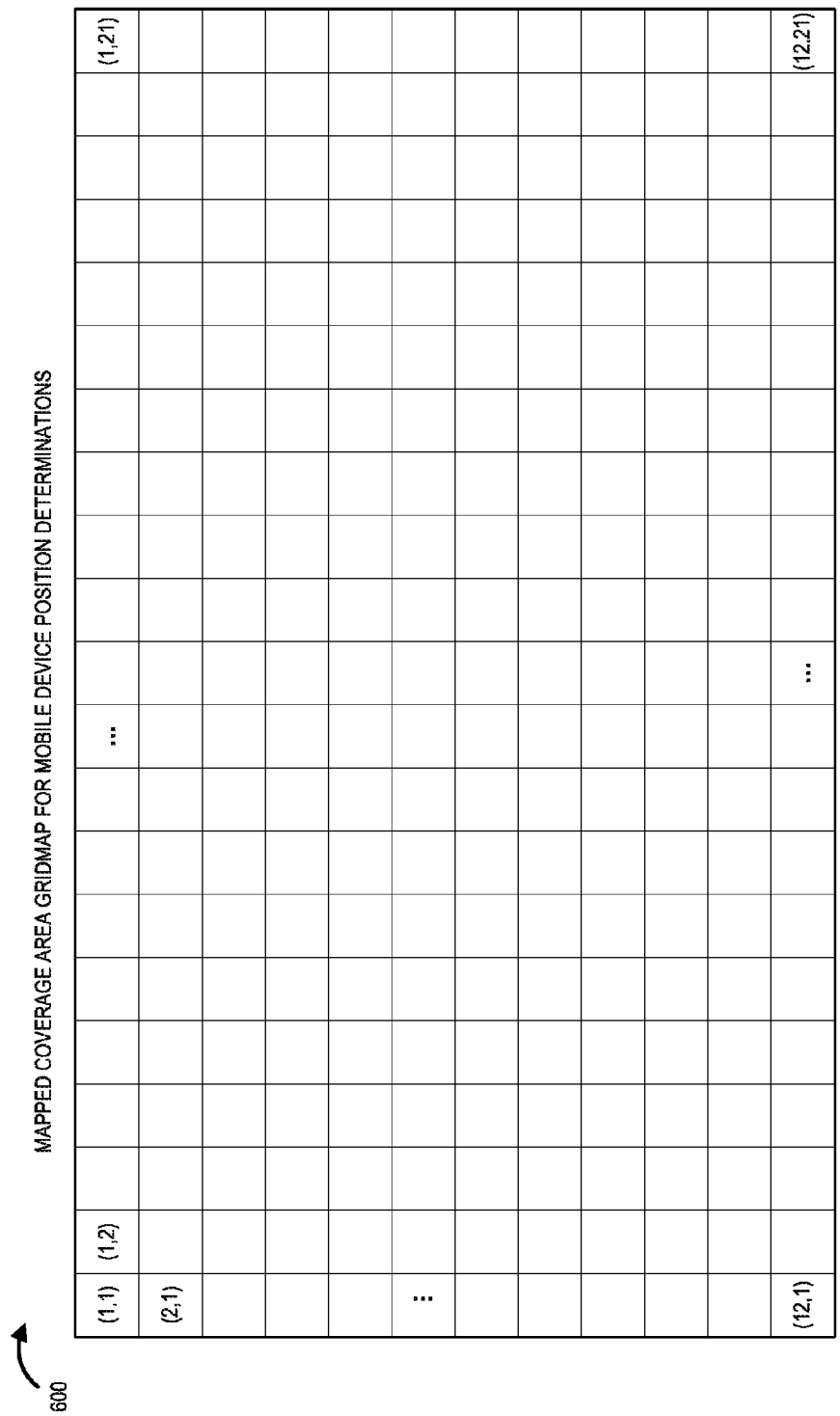
FIG. 6 is a drawing of an exemplary mapped coverage area gridmap for mobile device position determinations stored and used by a mobile wireless device.

FIGS. 6-12 are used to describe an example of an exemplary method of operating a mobile wireless device in accordance with an exemplary embodiment. FIG. 6 is a drawing 600 of an exemplary mapped coverage area gridmap for mobile device position determinations stored and used by a mobile wireless device. In this example, there are 252 indexed location units on the floor plan, and a matrix of 252 values may be used to represent a signal prediction map corresponding to an access point serving as a location anchor point for a particular signal characteristic which is to be measured. In general, there may be N×M location units in the gridmap, where N and M are positive values, and a set of N×M values may be used to represent the gridmap corresponding to an access point serving as a location anchor point, one value in the set corresponding to each unit in the gridmap.

Figure 7:
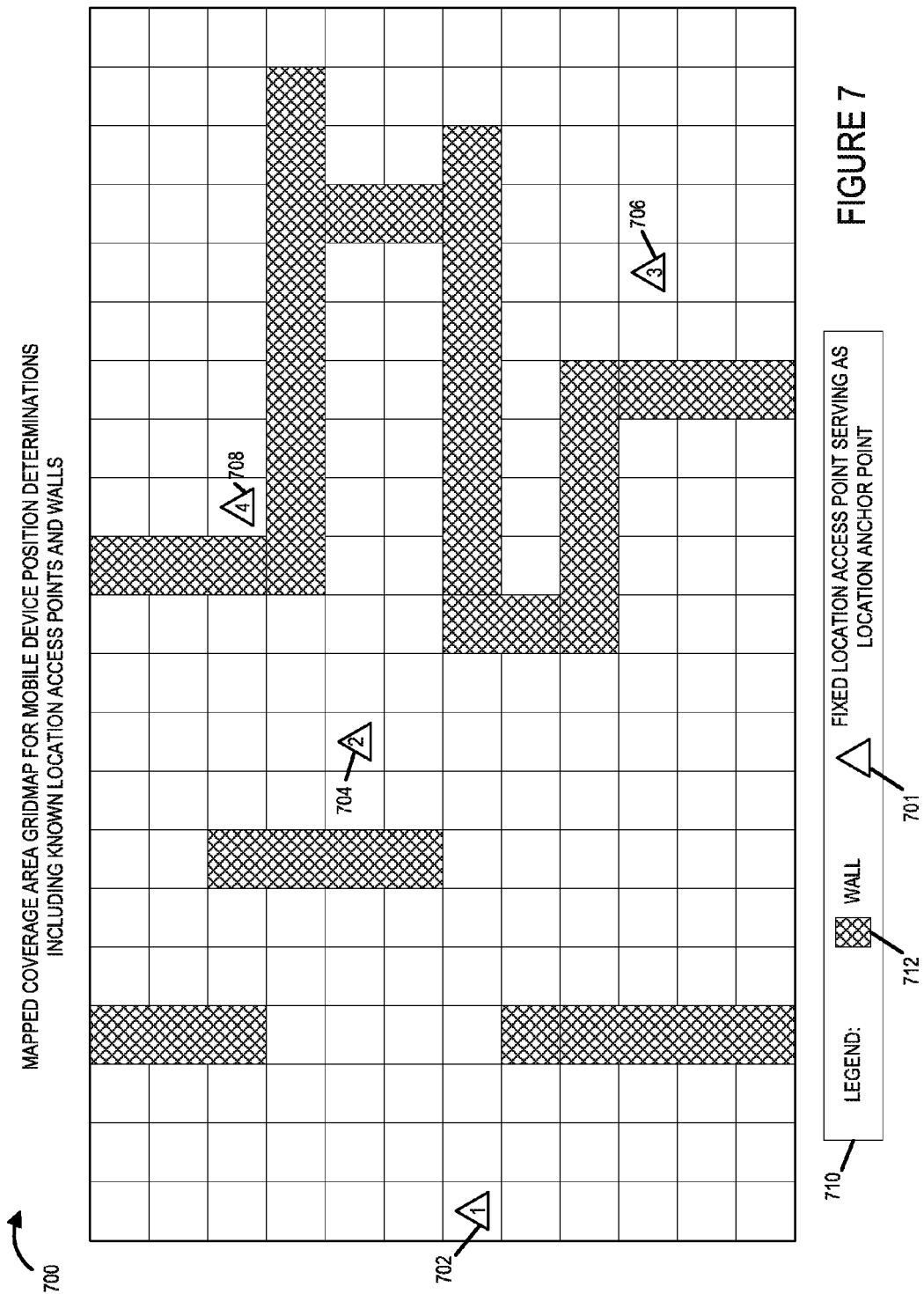
FIG. 7 shows exemplary fixed location access points serving as location anchor points and exemplary walls located on the gridmap of FIG. 6.

Drawing 700 of FIG. 7 shows exemplary fixed location access points serving as location anchor points (access point 1 702, access point 2 704, access point 3 706, access point 4 708) and exemplary walls located on the gridmap of FIG. 6. Legend 710 illustrates that walls are represented by cross-hatched shaded boxes 712, while fixed location access points serving as location anchor points are represented by triangle symbols 701. The number inside a triangle is an access point identifier. Information used to represent the coverage area of FIG. 6 and the locations of the access point and the locations of the walls represented in FIG. 7 is stored in the mobile wireless device, and can be used in combination with a stored set of parameters, e.g., a wall loss parameter, a path loss exponent parameter and a diffraction parameter, to generate signal prediction maps.

Figure 8:
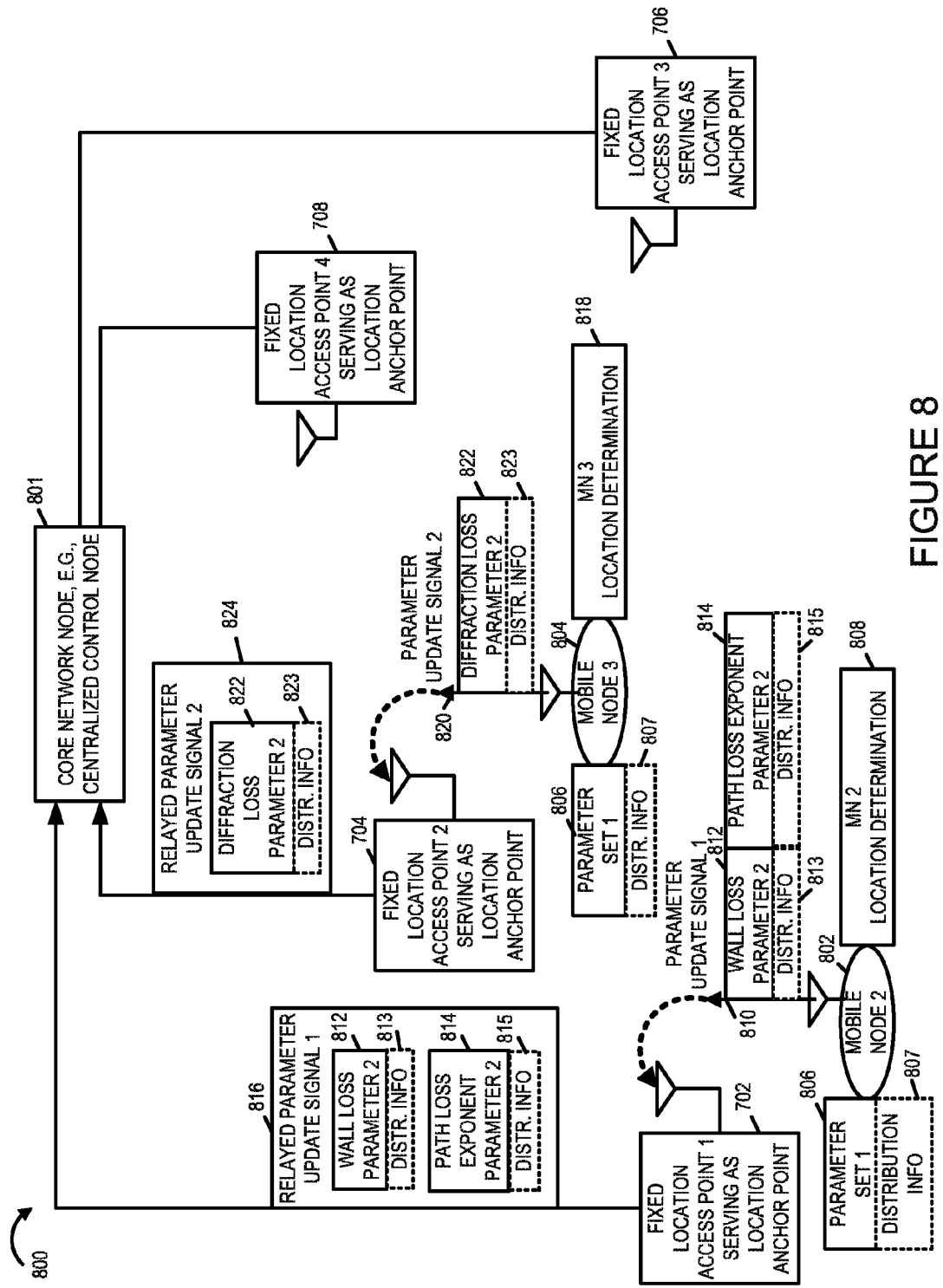
FIG. 8 is a drawing illustrating an example in which mobile nodes decide to update parameters used to generate signal prediction maps, generate parameter update signals, and transmit the generated parameter update signals to other nodes.

FIG. 8 is a drawing 800 illustrating an example in which mobile nodes decide to update parameters used to generate signal prediction maps, generate parameter update signals, and transmit the generated parameter update signals to other nodes. In this example, there is a core network node 801, e.g., a centralized control node, which is coupled via a backhaul network to fixed location anchor points (fixed location access point 1 702, fixed location access point 2 704, fixed location access point 3 706, fixed location access point 4 708). In drawing 800 there are also two exemplary mobile wireless devices (mobile node 2 802, mobile node 3 804).

Mobile node 2 802 has stored parameter set 1 806 which it uses in combination with stored gridmap 700 information and stored access point transmitter power information to generate one or more signal prediction maps. In some embodiments, mobile node 2 802 also stores distribution information 807 corresponding to parameter set 1 information 806. Mobile node 2 802 receives and measures signals from one or more access points (702, 704, 706, 708) and uses the measurements in combination with the generated one or more signal prediction maps to determine its position, obtaining mobile node 2 location determination 808. Mobile node 2 802 also determines a probability associated with the position determination. Then, mobile node 2 802 makes a decision as to whether or not to update any of the parameters used to generate the one or more signal prediction maps. In this example, mobile node 2 802 decides to update the wall loss parameter and the path loss exponent parameter. Mobile node 2 802 generates parameter update signal 1 810 which includes wall loss parameter 2 812 and path loss exponent parameter 2 814. Parameters (812, 814) are updates of the parameters in parameter set 1 806, e.g., refinements. In some embodiments, parameter update signal 1 806 also includes distribution information 813 corresponding to wall loss parameter 2 812 and distribution information 815 corresponding to path loss exponent parameter 2 814. Parameter update signal 1 810 is transmitted over the air, e.g., using a peer to peer protocol, to access point 1 702. Access point 1 702 receives signal 810, generates relayed parameter update signal 1 816 and transmits relayed parameter update signal 1 816 to core network node 801. Relayed parameter update signal 1 816 includes wall loss parameter 2 812 and path loss exponent parameter 2 814. In some embodiments, relayed parameter update signal 1 816 also includes distribution information 813 and distribution information 815. Core network node 801 receives signal 816 and recovers the information (812, 814), and in some embodiments information (813, 815), being communicated.

Mobile node 3 804 has stored parameter set 1 806 which it uses in combination with stored gridmap 700 information and stored access point transmitter power information to generate one or more signal prediction maps. In some embodiments, mobile node 3 804 also includes distribution information 807 corresponding to parameter set 1 806. Mobile node 3 804 receives and measures signals from one or more access points (702, 704, 706, 708) and uses the measurements in combination with the generated one or more signal prediction maps to determine its position, obtaining mobile node 3 location determination 818. Mobile node 3 804 also determines a probability associated with the position determination. Then, mobile node 3 804 makes a decision as to whether or not to update any of the parameters used to generate the one or more signal prediction maps. In this example, mobile node 3 804 decides to update the diffraction loss parameter. Mobile node 3 804 generates parameter update signal 2 820 which includes diffraction loss parameter 2 822. Diffraction loss parameter 2 822 is an update of a parameter in parameter set 1 806, e.g., a refinement. In some embodiments, parameter update signal 2 820 also includes distribution information 823 corresponding to diffraction loss parameter 2 822. Parameter update signal 2 820 is transmitted over the air, e.g., using a peer to peer protocol, to access point 2 704. Access point 2 704 receives signal 820, generates relayed parameter update signal 2 824 and transmits relayed parameter update signal 2 824 to core network node 801. Relayed parameter update signal 2 824 includes diffraction loss parameter 2 822, and in some embodiments, distribution information 823. Core network node 801 receives signal 824 and recovers the information 822, and in some embodiments the information 823, being communicated.

Figure 9:
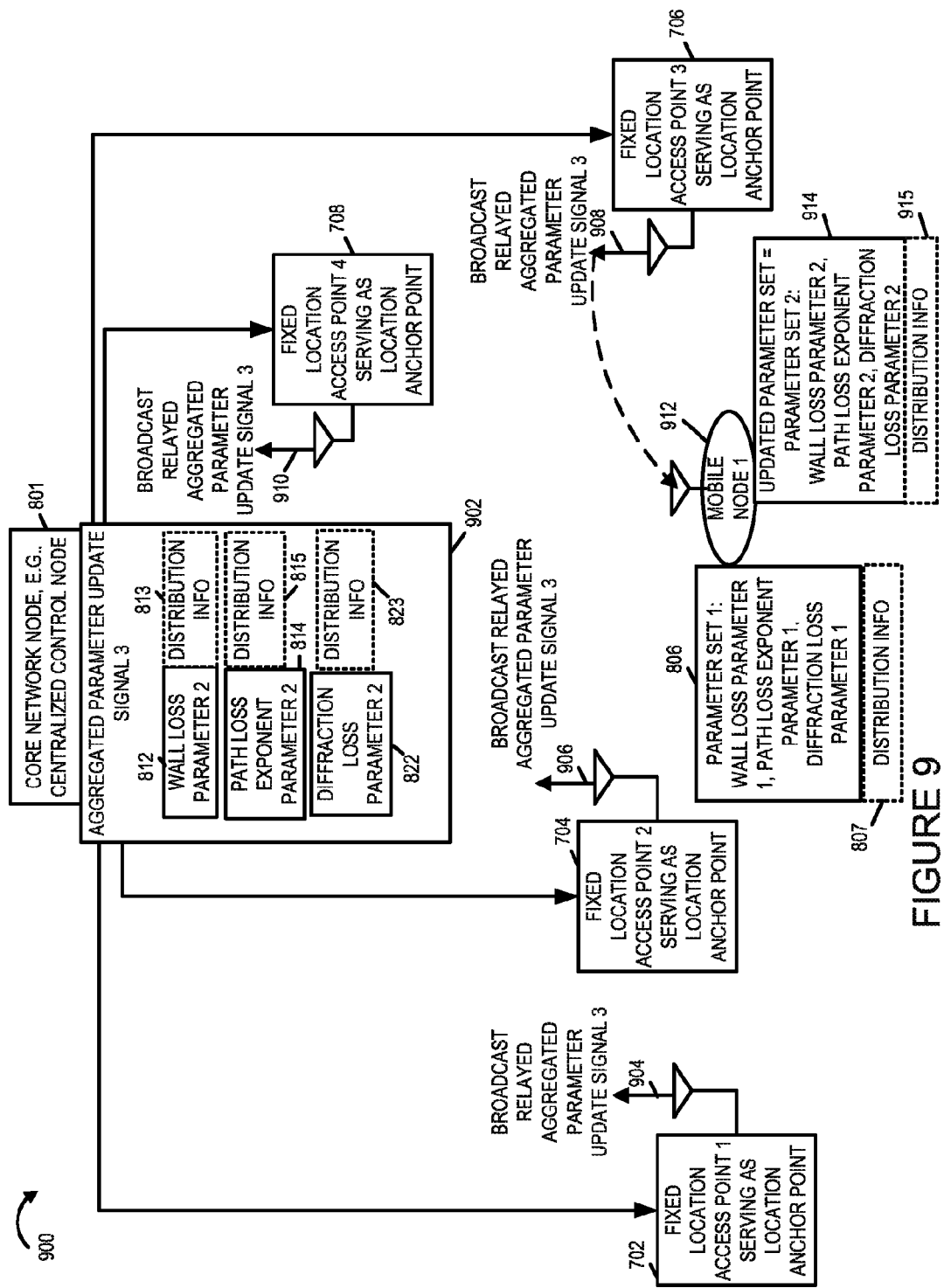
FIG. 9 is a drawing illustrating an example in which a network node combines received updated parameters used to generate signal prediction maps from a plurality of mobile nodes, generates a parameter update signal, and communicates the parameter update signal to mobile nodes.

FIG. 9 is a drawing 900 illustrating an example in which a core network node combines received updated parameters used to generate signal prediction maps from a plurality of mobile nodes, generates a parameter update signal, and communicates the parameter update signal to mobile nodes via access points. Core network node 801 aggregates the received update parameters ((812, 814), 822) sourced from mobile node 2 802 and mobile node 3 804 and generates aggregated parameter update signal 3 902. Aggregated parameter update signal 3 902 includes wall loss parameter 2 812, path loss exponent parameter 2 814 and diffraction loss parameter 2 822. In some embodiments, aggregated parameter update signal 3 902 also includes distribution information (813, 815, 823). Core network node 801 transmits aggregated parameter update signal 3 902 via the backhaul network to the access points (access point 1 702, access point 2 704, access point 3 706, access point 4 708). The access points (702, 704, 706, 708) receive signal 902 and broadcast the signal over the air as broadcast relayed aggregated parameter update signal 3 (904, 906, 908, 910), respectively. Mobile node 1 912, e.g., another mobile wireless device, which is in the vicinity of access point 3 706, receives and successfully recovers signal 908 from access point 3. Mobile node 1 912, which includes stored parameter set 1 information 806 used to generate signal prediction maps, updates its parameter set using the information included in signal 908 to obtain an updated parameter set 914. Parameter set 1 806 includes wall loss parameter 1, wall loss exponent parameter 1 and diffraction loss parameter 1. The updated parameter set 914 is parameter set 2 which includes wall loss parameter 2 812, path loss exponent parameter 2 814 and diffraction loss parameter 2 822. In some embodiments, mobile node 1 912 includes distribution information 807, receives updated distribution information (813, 815, 823) and generates and stored distribution information 915 corresponding to updated parameter set information 914. In some embodiments, distribution information 915 includes distribution information 813, distribution information 815 and distribution information 823.

Other mobile nodes, e.g., mobile node 2 802 and mobile node 3 804 may also update their stored parameter set used to generate signal prediction maps if they receive and successfully recover the aggregated parameter update signal. In some embodiments, other mobile nodes, e.g., mobile node 2 802 and mobile node 3 804 may also update their stored distribution information corresponding to the stored parameters used to generate a signal prediction map if they receive and successfully recover the aggregated parameter update signal.

Figure 10:
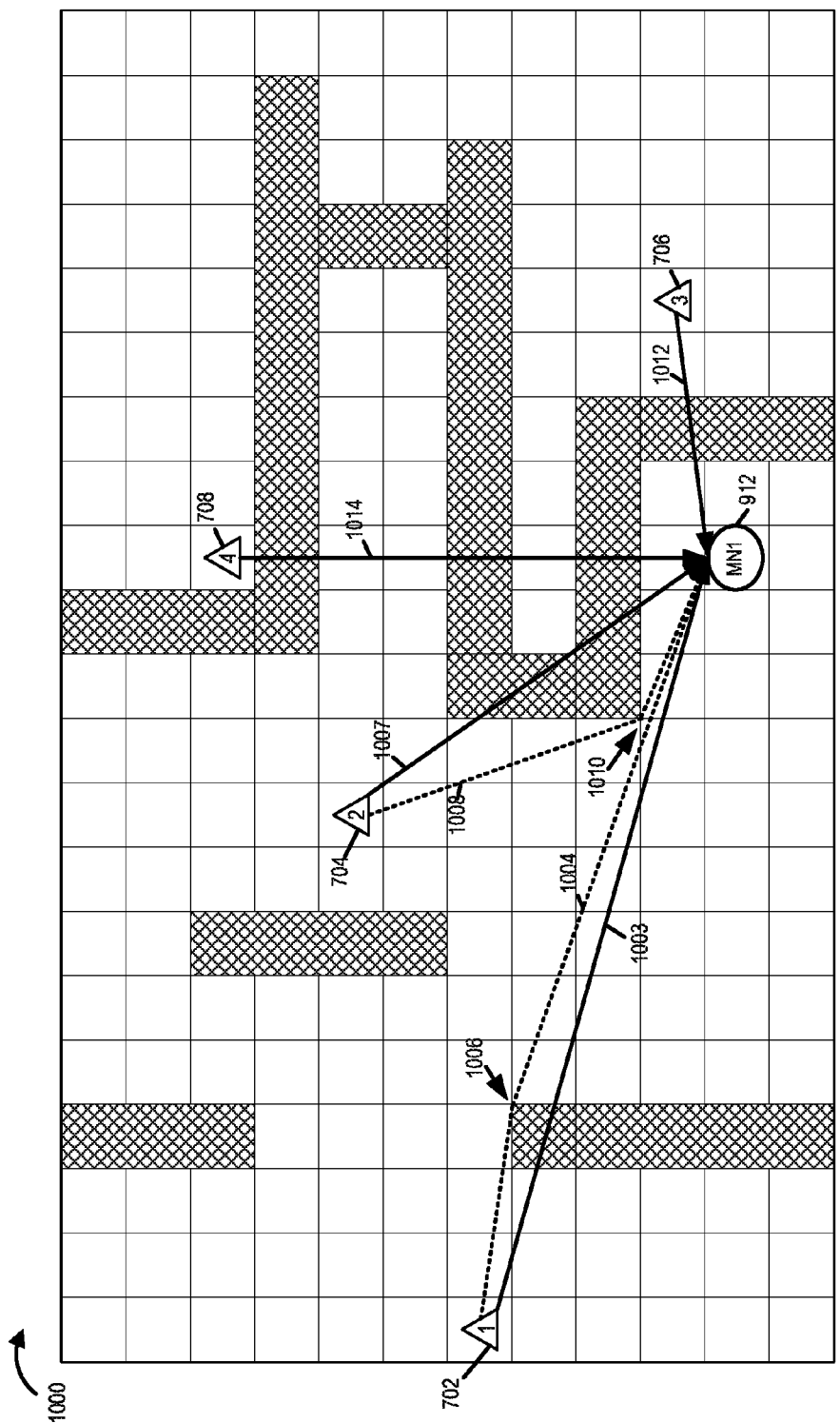
FIG. 10 is a drawing illustrating exemplary signaling and exemplary signal paths from the access points to an exemplary mobile node including exemplary direct paths and exemplary refraction paths.

FIG. 10 is a drawing 1000 illustrating exemplary signaling and exemplary signal paths from the access points (702, 704, 706, 708) to mobile node 1 912. In this example, the access points serving as location anchor points (access point 1 702, access point 2 704, access point 3 706, access point 4 708) transmits a signal, e.g., a peer discovery signal, which is received and measured by mobile node 1 912. The direct signal path 1003 from access point 1 702 to mobile node 1 912 traverses one wall. The diffraction signal path 1004 from access point 1 702 to mobile node 912 includes bending at wall corner 1006 due to diffraction. The direct signal path 1007 from access point 2 704 to mobile node 1 912 traverses two walls. The diffraction signal path 1008 from access point 2 704 to mobile node 1 912 includes bending at wall corner 1010 due to diffraction. The direct signal path 1012 from access point 3 706 to mobile node 1 912 traverses one wall. The direct signal path 1014 from access point 4 708 to mobile node 1 912 traverses three walls.

Drawing 1100 of FIG. 11 illustrates exemplary signaling, attenuation sources and signal measurements corresponding to the FIG. 10 example. Access point 1 702 transmits signal 1102 at a power level which is known and/or can be determined by the mobile node 1 912. Access point 2 704 transmits signal 1106 at a power level which is known and/or can be determined by the mobile node 1 912. Access point 3 706 transmits signal 1110 at a power level which is known and/or can be determined by the mobile node 1 912. Access point 4 708 transmits signal 1114 at a power level which is known and/or can be determined by the mobile node 1 912.

The transmitted signal 1102 along direct path 1003 is attenuated due to the direct signal path distance between access point 1 702 and mobile node 1 912 and by attenuation from passing through a single wall, as indicated by box 1103. The transmitted signal 1102 along the diffraction path 1004 is attenuated due to the diffraction path distance between access point 1 702 and mobile node 1 912 and by diffraction, as indicated by box 1104. Mobile 1 912 receives a composite signal including a direct and diffraction path components and measures the attenuated signal from access point 1 702. Mobile node 1 912 used the stored parameter set information 914 in combination with stored gridmap information 700 and known transmission power information regarding signal 1102 to generate a signal prediction map corresponding to access point 1. The measurements of received attenuated signal 1102 are compared to the generated signal prediction map to determine a most likely position of mobile node 1 912 and a probability associated with the position determination.

The transmitted signal 1106 along direct path 1007 is attenuated due to the direct signal path distance between access point 2 704 and mobile node 1 912 and by attenuation from passing through two walls, as indicated by box 1107. The transmitted signal 1106 along the diffraction path 1008 is attenuated due to the signal path distance between access point 2 704 and mobile node 1 912 and by diffraction, as indicated by box 1108. Mobile node 1 912 receives a composite signal including direct and diffraction path components and measures the attenuated signal from access point 2. Mobile node 1 912 used the stored parameter set information 914 in combination with stored gridmap information 700 and known transmission power information regarding signal 1106 to generate a signal prediction map corresponding to access point 2. The measurements of received attenuated signal 1106 are compared to the generated signal prediction map to determine a most likely position of mobile node 1 912 and a probability associated with the position determination.

The transmitted signal 1110 is attenuated due to the direct signal path distance between access point 3 706 and mobile node 1 912 and by attenuation from passing through a single wall, as indicated by box 1112. Mobile node 1 912 receives and measures the attenuated signal from access point 3 706. Mobile node 1 912 uses the stored parameter set information 914 in combination with stored gridmap information 700 and known transmission power information regarding signal 1110 to generate a signal prediction map corresponding to access point 3 706. The measurements of received attenuated signal 1110 are compared to the generated signal prediction map to determine a most likely position of mobile node 1 912 and a probability associated with the position determination.

The transmitted signal 1114 is attenuated due to the direct signal path distance between access point 4 708 and mobile node 1 912 and by attenuation from passing through three wall, as indicated by box 1116. Mobile node 1 912 receives and measures the attenuated signal from access point 4 708. Mobile node 1 912 uses the stored parameter set information 914 in combination with stored gridmap information 700 and known transmission power information regarding signal 1114 to generate a signal prediction map corresponding to access point 4 708. The measurements of received attenuated signal 1114 are compared to the generated signal prediction map to determine a most likely position of mobile node 1 912 and a probability associated with the position determination.

Mobile node 1 912 determines its estimated location, MN 1 location determination 1120, as a function of the position determinations obtained corresponding to the different access points. Mobile node 1 912 also determines a probability value or uncertainty associated with the overall position determination 1120.

Mobile node 1 912 makes a determination as to whether or not to update any of the parameters in the stored parameter set 914 used to generate the signal prediction maps, e.g., as a function of the position determination probability and/or the amount of change in a prediction parameter. For example, mobile node 1 912 decides to update a parameter is the estimated accuracy of the position determination is above a predetermined reliability threshold and the amount of change exceeds a predetermined change threshold level. In this example, mobile node 1 912 decides to update the full set of parameters and determines adjusted parameters, determined adjusted prediction parameters 1124. In some embodiments, mobile node 1 912 also updates stored distribution information 915 generating and storing distribution information 1125.

FIG. 12 is a drawing illustrating that mobile node 1 912 generates and communicates a parameter update signal to communicate the determined adjusted prediction parameters 1124. In some embodiments, mobile node 1 912 also generates and communicates distribution information 1125 corresponding to the parameters 1124. Mobile node 1 912 generates parameter update signal 4 1202 which includes wall loss parameter 3 1204, path loss exponent parameter 3 1206 and diffraction loss parameter 3 1208. Parameter update signal 4 1202, in some embodiments, also includes distribution information (1205, 1207, 1209) corresponding to (wall loss parameter 3 1204, path loss exponent parameter 3 1206 and diffraction loss parameter 3 1208), respectively. Mobile node 912 transmits parameter update signal 4 1202 to fixed location access point 3 706, e.g., via a peer to peer signaling protocol. Access point 3 706 receives signal 706, and generates relayed parameter update signal 4 1210 which it communicates to core network node 801 via the backhaul network. Parameter update information included in signal 1210 may be communicated to other nodes, e.g., under the control of core network node 801, e.g., in a similar manner as signal 902 was communicated.

In the example of FIGS. 6-12, signals transmitted by access points (702, 704, 706, 710) were measured by mobile devices (802, 804, 912), and the measurements were used in performing position determinations using signal prediction maps. In some embodiments, the transmitted signal which is measured is one of: a peer to peer discovery signal, a peer to peer resource control signal, a peer to peer pilot signal, and peer to peer traffic signal. In some embodiments, for at least some locations the mobile device measures signals from a different number of access points. In some embodiments, for some locations a mobile node uses received measured signals from a single access point to perform a position determination. In some embodiments, different portions of the grid correspond to different sets of access points.

The example of FIGS. 6-12 describes parameter update information being routed through an access point and a core network node. In various embodiments, a core network node is not involved, and the parameter updating information is communicated between access points and mobile wireless devices. In some embodiments, parameter update information is communicated directly between mobile wireless devices, e.g., via peer to peer signaling. In some such embodiments, a mobile wireless device may, and sometimes does, combine, e.g., aggregate and/or average, received parameter update information, from multiple mobile wireless devices. In some embodiments, parameter update signals are broadcast by mobile wireless devices, e.g., which are intended to be received by other mobile wireless devices in its vicinity. In some such embodiments, the parameter updating signals are communicated during peer discovery intervals in a recurring peer to peer timing structure. In some embodiments, the peer discovery signals carry peer discovery expressions which may, and sometimes do, convey parameters used to generate fingerprint prediction maps, e.g., a wall loss parameter, a path loss exponent parameter, a reflection loss parameter, a diffraction, and/or statistical information pertaining to the parameters.

In some embodiments, an individual mobile wireless device receiving parameter update signals from a plurality of mobile wireless devices makes a decision as to whether or not to update its stored set of parameters used to generate a signal prediction map. In some such embodiments, when the mobile wireless device decides to update its set of parameters used to generate a signal prediction map the updating may, and sometimes does, include one or more of: replacing a stored parameter with a received parameter, replacing a stored parameter with a new parameter generated as a function of a received parameter, replacing a stored parameter with a new parameter generated as a function of received parameters from a plurality of mobile wireless devices, e.g., an average value or a weighted average value. In some embodiments, a replaced set of parameters used to generate a signal predication map may, and sometimes does, include information obtained from and/ or derived from information received from a plurality of mobile wireless devices, e.g., aggregated information with different parameters being received from different mobile wireless devices or different parameter updates being derived from information received from different mobile wireless devices.

In some embodiments, a mobile wireless device receives additional information along with the received parameter update information. For example, an estimation of a mobile device position determination accuracy corresponding to the update, in some embodiments, is communicated with a parameter update and/or statistical information relating to the parameter is communicated with the parameter update. In various embodiments, the additional communicated information, e.g., estimated position determination accuracy, is used by the mobile wireless device receiving the parameter update signal in making its decision whether or not to use the received parameter update and/or how much to weight the received parameter update.

In some embodiments, the mobile node, calculates estimated path loss between a an access point serving as a location anchor point and the mobile node as a function of the direct path distance and the diffraction path distance, for different possible positions of the mobile device to generate a set of signal prediction values corresponding to a signal prediction map. In some such embodiments, the estimation includes using: (i) a set of parameters corresponding to the environment, e.g., a wall loss parameter, e.g., Wall_loss_parameter, a path loss exponent parameter, e.g., $PL_{exponent}$, and a diffraction parameter, e.g., Diffraction_loss_parameter, (ii) a floor map, e.g., a grid map corresponding to the coverage area including information identifying the location of the access point serving as a location anchor point, the location of walls, and (iii) information identifying the power at the transmitter of the signal being measured.

In various embodiments, estimation of path loss performed by the mobile node uses the following equation:

$$PL_{dB}(d_{direct}, d_{diff}) = PL_{constant\ dB} + \min(\text{Direct\_Path\_Loss\_Value}_{dB},$$

Diffraction_Path_Loss_Value$_{dB}$), where $d_{direct}$ is the direct path distance between the access point serving as a location anchor point and a potential location of the mobile device, where $d_{diff}$ is a diffraction path distance between the access point serving as a location anchor point and a potential location of the mobile device. In some embodiments, the direct path distance is the straight line path distance between the access point serving as a location anchor point and the potential location of the mobile device without consideration of walls. In some embodiments, the diffraction path distance is the shortest path between the access point serving as a location anchor point and the potential location of the mobile device, in which the diffraction path avoids walls. In various embodiments, the mobile node calculates the direct path distance and diffraction path distances using the stored map information.

In some embodiments, $PL_{constant\ dB} = 20 \log_{10}$ (Friis constant). In some such embodiments, the Friis constant=$4\pi$ fc/1 MHz, where fc is the frequency of the signal being measured.

In various embodiments, Direct_Path_Loss_Value$_{dB}$ = (Wall_loss_paramter)(Num_walls_on_direct_path)+10 ($PL_{exponent}$)($\log_{10}(d_{direct})$), where Num_walls_on direct_path is the number of walls a direct path signal would have to traverse on the direct path between the access point serving as a location anchor point and the potential mobile node location based on the topology in the stored map information.

In various embodiments, Diffraction_Loss_Value$_{dB}$ = (Diffraction_loss_paramter)(Num_edges_on_shortestpath_thatavoidsallwalls)+10($PL_{exponent}$)($\log_{10}(d_{diff})$), where Num_edges_on_shortestpath_thatavoidsallwalls is the number of corners that a diffraction signal would bend around on the diffraction path between the access point serving as a location anchor point and the potential mobile node location based on the topology in the stored map information.

In some embodiments, the wall loss parameter is within the approximate range of 3 to 6 dBs. In some embodiments, the path loss exponent parameter is within the approximate range of 1.8 to 2.2 dBs. In some embodiments, the diffraction path parameter is within the approximate range of 10 to 13 dBs. In one exemplary embodiment a floor map grid is, e.g., 34×70 meters with resolution to 1 meter.

In various embodiments, the set of parameters used to generate signal prediction maps, e.g., the wall loss parameter, the path loss exponent parameter, and the diffraction path parameter, are successively refined, e.g., via parameter updates e.g., in accordance with the method of flowchart 200 of FIG. 2.

In some embodiments, as part of generating an updated set of parameters, the mobile determines a set of parameters that minimizes a function. For example, the mobile node determines that the best parameters=$\operatorname{argmin}_{3 parameters}$|Meas$-TX_{power}+PL_{dB}(d_{direct}, d_{diff})\|^2$, where Meas=the measured power of the transmitted signal being measured and TXpower=the transmission power of the signal being measured and $PL_{dB}(d_{direct}, d_{diff})$ is the predicted path loss value at the determined location of the mobile.

In some embodiments including measurements corresponding to signals transmitted by a different access points, an updated set of parameters is calculated by the mobile node based on readings of detected signals from multiple access points. For example, the mobile node determines that the best parameters=$\operatorname{argmin}_{3 paramters}$||Meas$-TX_{power}+PL_{dB}(d_{direct}, d_{diff})\|^2$, where Meas=a vector of the measured power of the transmitted signal being measured corresponding to the multiple access points and TXpower=a vector of the transmission power of the signal being measured, and $PL_{dB}(d_{direct}, d_{diff})$ is a vector of predicted path loss values, corresponding to the multiple access points, at the determined locations of the mobiles.

In some embodiments the transmission power TXpower is also a parameter that is estimated. In another embodiment, each of the parameters has a corresponding prior distribution associated with it. Based on the determined positions, the measurements of the signal characteristics taken at those locations and the prior distributions on the parameters, a set of posterior distributions of the parameters is computed. In some embodiments, the posterior distributions may then be used to generate the prediction map which would include of a set of distributions, one for each physical location on the map, of the predicted signal characteristics. In other embodiments, the mean or some other moment of the posterior distributions is computed and used to generate the prediction map.

In some embodiments, the diffraction calculations include adjustments due to reflections and/or waveguide losses. In some embodiments, a plurality of wall loss parameter values are used corresponding to different types of walls, e.g., different materials, different wall thickness, etc.

In various embodiments, a network node, e.g., a core network node or an access point serving as a base station, combines, e.g., aggregates, averages, performs weighting averages, and/or modifies a set of parameters used to generate a signal prediction map based on received input, e.g., suggested parameter adjustments, from a plurality of mobile wireless devices. In some such embodiments, the combined updated information is communicated to other mobile wireless devices, e.g., via a broadcast signal.

In various embodiments, a mobile wireless device, combines, e.g., aggregates, averages, performs weighting averages, and/or modifies a set of parameters used to generate a signal prediction map based on received input, e.g., suggested parameter adjustments, from a plurality of other mobile wireless devices. In some such embodiments, the combined updated information is communicated to other mobile wireless devices, e.g., via a broadcast signal.

Various aspects relate to aspects of distributed learning of a fingerprint prediction maps. In various embodiments, the map is parametric in the sense that a finite set of adjustable parameters determine fingerprint predictions made using the map. Various features address the problem of learning or estimating or choosing a good set of the parameters for a parametric model so as to achieve accuracy of fingerprint predictions. In some situations a positioning system may have sufficient redundancy so that a mobile device can determine its position to a certain high level of reliability without the determination necessarily depending on all available measurements. In such a case the device can, and sometimes does, independently sample those measurements that were not useful for position determination, by virtue of being significantly different, in value, than the predictions, so as to gather information that can be used to improve the accuracy of the fingerprint map(s). In particular, in some embodiments, a device may infer information about one or more parameters used in a fingerprinting map. In one embodiment, a device may accomplish this inference by using a discrete ray-tracing approach. For example, by tracing a radio wave's path from a fixed location access point serving as a location anchor point to the determined position, the method can determine the relationship between the fingerprint at that position and the wall parameters, e.g., reflection loss, refraction loss, diffraction loss, of the walls relevant for that path. The redundant measurements previously sampled can then be used to solve the inverse problem: given the measured fingerprints and the determined relationship between fingerprints and parameters, find the parameters that fit those measurements. In another embodiment, the mobile may randomly or deterministically adjust a subset of the parameters of the fingerprint map in an attempt to minimize the difference between the resulting fingerprint predictions and the sampled measurements.

In various embodiments, once the mobile wireless device estimates the values of the parameters in question, it may, and sometimes does, encode them in a signal and communicate this signal to other mobiles or network devices. The communicated information may be used to improve positioning directly or to improve fingerprinting maps that may in turn be provided for later instances of positioning. In one embodiment, the mobile transmits the signal carrying information about the parameters to another mobile device. The updated parameter values may be, and sometimes are, used by the mobile that receives them to generate an updated fingerprint prediction map. This mobile may, and sometimes does, aggregate parameter updates received from multiple mobiles to generate an updated fingerprint prediction map. The mobile may, and sometimes does, then use the updated fingerprint prediction map to position itself or to otherwise participate in the positioning system operation. In another embodiment, the mobile transmits the signal bearing the parameter update information to a network device, e.g., a.k.a. an anchor point. The updated parameter values may be, and sometimes are, used by the network device to generate an updated fingerprint prediction map. The network device may aggregate parameter updates received from multiple mobiles to generate an updated fingerprint prediction map. The new fingerprint prediction map may be transmitted to mobiles which then use it for subsequent positioning operations. In some embodiments, the transmitted update signals are directed to one or more particular mobile wireless devices. In some embodiments, the transmitted update signals are broadcast signals. In another embodiment, the network device encodes and transmits to the mobile wireless devices a set of updated parameters, e.g., updated parameters that have been aggregated from the parameter updates received from individual mobile wireless devices. In some embodiments, the transmitted update signals are directed to one or more particular mobile wireless devices. In some embodiments, the transmitted update signals are broadcast signals. The mobile wireless devices may, and sometimes do, then use the received set of updated parameters to generate the fingerprint prediction map which they may then use for positioning.

In various embodiments, mobile node 912 of FIG. 9 is mobile wireless device 300 of FIG. 3 and/or implements a method in accordance with flowchart 200 of FIG. 2.

In various embodiments a device, e.g., mobile wireless device 300 of FIG. 3, includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes such as location determination server nodes, mobile nodes such as mobile terminals, access points such as base stations serving as location anchor points, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer to peer signaling protocol. Various embodiments are well suited to location determination in indoor environments.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a mobile wireless device, comprising:
measuring signal characteristics of received signals;
determining a position of the mobile wireless device based on the measured signal characteristics;
adjusting at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device;
transmitting a prediction parameter update signal including at least one of: (i) the adjusted prediction parameter, (ii) adjusted statistics of a prediction parameter, or (iii) the adjusted distribution of a prediction parameter, to another mobile wireless device or a network device;
receiving a second prediction parameter update signal from another mobile wireless device;
generating a first prediction map using parameter information included in said second prediction parameter update signal; and
using the generated first prediction map and said measured signal characteristics to determine the position of the mobile wireless device.

2. The method of claim 1,
wherein said adjusting includes adjusting said prediction parameter, said prediction parameter is one of a wall loss parameter, a diffraction loss parameter, a reflection loss parameter or a refraction loss parameter; and
wherein said prediction parameter which is adjusted is a prediction parameter which was used in determining the position of the mobile wireless device, said adjusting being performed when the position of the mobile wireless device is determined to a predetermined degree of certainty but not when the position of the mobile wireless device is determined with a lower degree of certainty.

3. The method of claim 1, wherein said prediction parameter is not a signal measurement value.

4. The method of claim 2, wherein the received second prediction parameter update signal includes parameter statistics in addition to at least one prediction parameter, said prediction parameter statistics including at least one of a mean or a variance.

5. The method of claim 4, wherein said second prediction parameter update signal is received prior to determining the position of the mobile wireless device and said first prediction map is generated prior to performing said step of determining a position of the mobile wireless device, said step of determining the position of the mobile wireless device including:
using the generated first prediction map and said measured signal characteristics to determine the position of the mobile wireless device.

6. A mobile wireless device, comprising:
means for measuring signal characteristics of received signals;
means for determining a position of the mobile wireless device based on the measured signal characteristics;
means for adjusting at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device;

means for transmitting a prediction parameter update signal including at least one of: (i) the adjusted prediction parameter, (ii) adjusted statistics of a prediction parameter, or (iii) the adjusted distribution of a prediction parameter, to another mobile wireless device or a network device;

means for receiving a second prediction parameter update signal from another mobile wireless device;

means for generating a first prediction map using parameter information included in said second prediction parameter update signal; and means for using the generated first prediction map and said measured signal characteristics to determine the position of the mobile wireless device.

7. The mobile wireless device of claim 6, wherein said means for adjusting adjust said prediction parameter, said prediction parameter being one of a wall loss parameter, a diffraction loss parameter, a reflection loss parameter or a refraction loss parameter; and wherein said prediction parameter which is adjusted is a prediction parameter which was used in determining the position of the mobile wireless device, said means for adjusting performing adjustment of said prediction parameter when the position of the mobile wireless device is determined to a predetermined degree of certainty but not when the position of the mobile wireless device is determined with a lower degree of certainty.

8. The mobile wireless device of claim 6, wherein the prediction parameter is not a signal measurement value.

9. The mobile wireless device of claim 6, wherein the received second prediction parameter update signal includes parameter statistics in addition to at least one prediction parameter, said prediction parameter statistics including at least on of a mean or a variance.

10. The mobile wireless device of claim 9, wherein said means for receiving receive said second prediction parameter update signal prior to said means for determining determine the position of the mobile wireless device;

wherein said means for generating a first prediction map generates said first prediction map prior to said means for determining a position of the mobile device determining a position of the mobile wireless device, and wherein said means for determining the position of the mobile wireless device includes means for using the generated first prediction map and said measured signal characteristics to determine the position of the mobile wireless device.

11. A computer program product for use in a mobile wireless device, the computer program product comprising:

a non-transitory computer readable medium comprising:

code for causing at least one computer to measure signal characteristics of received signals;

code for causing said at least one computer to determine a position of the mobile wireless device based on the measured signal characteristics;

code for causing said at least one computer to adjust at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device;

code for causing said at least one computer to transmit a prediction parameter update signal including at least one of: (i) the adjusted prediction parameter, (ii) adjusted statistics of a prediction parameter, or (iii) the adjusted distribution of a prediction parameter, to another mobile wireless device or a network device;

code for receiving a second prediction parameter update signal from another mobile wireless device;

code for generating a first prediction map using parameter information included in said second prediction parameter update signal; and code for using the generated first prediction map and said measured signal characteristics to determine the position of the mobile wireless device.

12. The computer program product of claim 11, wherein said code for causing said at least one computer to adjust includes code for causing said at least one computer to adjust said prediction parameter, said prediction parameter being one of a wall loss parameter, a diffraction loss parameter, a reflection loss parameter or a refraction loss parameter; and wherein said prediction parameter which is adjusted is a prediction parameter which was used in determining the position of the mobile wireless device, said adjusting being performed when the position of the mobile wireless device is determined to a predetermined degree of certainty but not when the position of the mobile wireless device is determined with a lower degree of certainty.

13. A mobile wireless device comprising:

at least one processor configured to:

measure signal characteristics of received signals;

determine a position of the mobile wireless device based on the measured signal characteristics;

adjust at least one of: (i) a prediction parameter which can be used in generating a prediction map, (ii) statistics of a prediction parameter, or (iii) a distribution of a prediction parameter, based on one or more of the measured signal characteristics and the determined position of the mobile wireless device;

transmit a prediction parameter update signal including at least one of: (i) the adjusted prediction parameter, (ii) adjusted statistics of a prediction parameter, or (iii) the adjusted distribution of a prediction parameter, to another mobile wireless device or a network device;

memory coupled to said at least one processor;

receive a second prediction parameter update signal from another mobile wireless device;

generate a first prediction map using parameter information included in said second prediction parameter update signal; and using the generated first prediction map and said measured signal characteristics to determine the position of the mobile wireless device.

14. The mobile wireless device of claim 13, wherein said at least one processor is configured to adjust said prediction parameter, said prediction parameter being one of a wall loss parameter, a diffraction loss parameter, a reflection loss parameter or a refraction loss parameter; and wherein said prediction parameter which is adjusted is a prediction parameter which was used in determining the position of the mobile wireless device, said at least one processor being configured to adjust said prediction parameter when the position of the mobile wireless device is determined to a predetermined degree of certainty but not when the position of the mobile wireless device is determined with a lower degree of certainty.

15. The mobile wireless device of claim 13, wherein the said prediction parameter is not a signal measurement value.

16. The mobile wireless device of claim 13, wherein the received second prediction parameter update signal includes parameter statistics in addition to at least one prediction parameter, said prediction parameter statistics including at least on of a mean or a variance.

17. The mobile wireless device of claim 16,
   wherein said at least one processor receives said second prediction parameter update signal prior to determining the position of the mobile wireless device;
   wherein said at least one processor is further configured to generate said first prediction map prior to determining a position of the mobile wireless device; and
   wherein said at least one processor is configured to use the generated first prediction map and said measured signal characteristics to determine the position of the mobile wireless device, as part of being configured to determine the position of the mobile wireless device.

* * * * *